(12) United States Patent
Fu et al.

(10) Patent No.: US 11,347,857 B2
(45) Date of Patent: May 31, 2022

(54) KEY AND CERTIFICATE DISTRIBUTION METHOD, IDENTITY INFORMATION PROCESSING METHOD, DEVICE, AND MEDIUM

(71) Applicant: Alibaba Group Holding Limited, Grand Cayman (KY)

(72) Inventors: Yingfang Fu, Beijing (CN); Peng Xiao, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 271 days.

(21) Appl. No.: 16/457,650

(22) Filed: Jun. 28, 2019

(65) Prior Publication Data

US 2020/0004967 A1  Jan. 2, 2020

(30) Foreign Application Priority Data

Jul. 2, 2018 (CN) .......................... 201810707787.3

(51) Int. Cl.
    *G06F 21/57* (2013.01)
    *H04L 9/08* (2006.01)
    *H04L 9/32* (2006.01)

(52) U.S. Cl.
    CPC .......... *G06F 21/572* (2013.01); *H04L 9/0869* (2013.01); *H04L 9/0894* (2013.01); *H04L 9/3268* (2013.01)

(58) Field of Classification Search
    CPC ........ G06F 21/50; G06F 21/57; G06F 21/572; H04L 9/08; H04L 9/0894; H04L 9/0869; H04L 9/3268; H04L 9/0877; H04L 9/0825
    See application file for complete search history.

(56) References Cited

U.S. PATENT DOCUMENTS

| 7,967,193 B1 | 6/2011 | McGinley et al. |
| 8,442,960 B1 | 5/2013 | Meyer et al. |

(Continued)

FOREIGN PATENT DOCUMENTS

| CN | 1553349 | 12/2004 |
| CN | 201051744 Y | 4/2008 |

(Continued)

OTHER PUBLICATIONS

Office Action for U.S. Appl. No. 16/538,008, dated Jun. 8, 2021, Fu, "Key Processing Methods and Apparatuses, Storage Media, and Processors", 21 Pages.

(Continued)

*Primary Examiner* — Shaqueal D Wade-Wright
(74) *Attorney, Agent, or Firm* — Lee & Hayes, P.C.

(57) ABSTRACT

Identity information processing method and apparatus are disclosed. The method includes: obtaining customized information of a user process on an integrated chip; determining a target operational firmware preloaded on a reconfigurable chip according to the customized information; generating first process identity information used for verifying the user process based on the target operational firmware and a fixed operational firmware of a non-reconfigurable chip; and providing the first process identity information to a privacy certificate issuing authority for performing firmware legitimacy verification of an operational firmware to determine that an identity of the user process is legitimate according to a result of the firmware legitimacy verification. Therefore, the first process identity information generated for the user process by the integrated chip can prove the legitimacy of the fixed operational firmware of the non-reconfigurable part of the firmware, and also prove the legitimacy of the target operational firmware of the reconfigurable part.

20 Claims, 20 Drawing Sheets

(56) References Cited

U.S. PATENT DOCUMENTS

| | | |
|---|---|---|
| 8,645,711 B2 | 2/2014 | Ohhashi |
| 8,767,957 B1 | 7/2014 | Bagchi et al. |
| 8,931,082 B2 | 1/2015 | Rodgers et al. |
| 9,081,954 B2 | 7/2015 | Forristal |
| 9,246,690 B1 | 1/2016 | Roth et al. |
| 9,294,282 B1 | 3/2016 | Potlapally et al. |
| 9,530,002 B1 | 12/2016 | Hamlin |
| 9,893,882 B1 | 2/2018 | Thadishetty |
| 10,211,977 B1 | 2/2019 | Roth et al. |
| 10,891,366 B1 | 1/2021 | Wu et al. |
| 11,026,628 B1 | 6/2021 | Bruinsma et al. |
| 2003/0097581 A1 | 5/2003 | Zimmer |
| 2003/0188146 A1 | 10/2003 | Hale et al. |
| 2004/0158828 A1 | 8/2004 | Zimmer et al. |
| 2004/0190721 A1 | 9/2004 | Barrett et al. |
| 2005/0108564 A1 | 5/2005 | Freeman et al. |
| 2005/0166024 A1 | 7/2005 | Angelo et al. |
| 2005/0251857 A1 | 11/2005 | Schunter et al. |
| 2005/0262571 A1 | 11/2005 | Zimmer et al. |
| 2005/0289646 A1 | 12/2005 | Zimmer et al. |
| 2006/0010326 A1 | 1/2006 | Bade et al. |
| 2006/0059369 A1 | 3/2006 | Fayad et al. |
| 2006/0075223 A1 | 4/2006 | Bade et al. |
| 2006/0155988 A1 | 7/2006 | Hunter et al. |
| 2006/0289659 A1 | 12/2006 | Mizushima |
| 2007/0094711 A1 | 4/2007 | Corley et al. |
| 2007/0143543 A1 | 6/2007 | Lin et al. |
| 2007/0154018 A1 | 7/2007 | Watanabe |
| 2007/0294178 A1 | 12/2007 | Pinder et al. |
| 2008/0005586 A1 | 1/2008 | Munguia |
| 2008/0046581 A1 | 2/2008 | Molina et al. |
| 2008/0072071 A1 | 3/2008 | Forehand et al. |
| 2008/0077993 A1 | 3/2008 | Zimmer et al. |
| 2008/0126779 A1 | 5/2008 | Smith |
| 2008/0192937 A1 | 8/2008 | Challener |
| 2008/0223925 A1 | 9/2008 | Saito et al. |
| 2008/0244746 A1 | 10/2008 | Rozas et al. |
| 2008/0270781 A1 | 10/2008 | Ibrahim et al. |
| 2009/0043708 A9 | 2/2009 | Silverbook et al. |
| 2009/0067689 A1 | 3/2009 | Porter et al. |
| 2009/0070593 A1 | 3/2009 | Boshra et al. |
| 2009/0144046 A1 | 6/2009 | Rothman et al. |
| 2009/0172378 A1 | 7/2009 | Kazmierczak et al. |
| 2010/0011219 A1 | 1/2010 | Burton et al. |
| 2010/0023747 A1 | 1/2010 | Asnaashari et al. |
| 2010/0082960 A1 | 4/2010 | Grobman et al. |
| 2010/0088499 A1 | 4/2010 | Zimmer et al. |
| 2010/0174652 A1 | 7/2010 | Shear et al. |
| 2010/0281273 A1 | 11/2010 | Lee et al. |
| 2011/0013773 A1 | 1/2011 | Pinder |
| 2011/0211690 A1 | 9/2011 | Tu et al. |
| 2011/0302638 A1 | 12/2011 | Cha et al. |
| 2012/0151223 A1 | 6/2012 | Conde Marques et al. |
| 2012/0185683 A1* | 7/2012 | Krstic .................. G06F 21/44 713/2 |
| 2012/0201379 A1 | 8/2012 | Fuchs et al. |
| 2012/0266252 A1 | 10/2012 | Spiers et al. |
| 2012/0331285 A1 | 12/2012 | Bangerter et al. |
| 2013/0016832 A1 | 1/2013 | Yamashita |
| 2013/0104188 A1 | 4/2013 | Western et al. |
| 2013/0125204 A1* | 5/2013 | La Fever .............. G06F 21/73 726/2 |
| 2013/0318343 A1 | 11/2013 | Bjarnason et al. |
| 2014/0068766 A1 | 3/2014 | Klustaitis et al. |
| 2014/0122897 A1 | 5/2014 | Dodeja et al. |
| 2014/0140512 A1 | 5/2014 | Hadley |
| 2014/0250291 A1 | 9/2014 | Adams et al. |
| 2014/0256419 A1* | 9/2014 | Laputz .................. G06F 21/575 463/29 |
| 2014/0258733 A1 | 9/2014 | Scott-Nash |
| 2014/0298040 A1 | 10/2014 | Ignatchenko et al. |
| 2014/0359268 A1 | 12/2014 | Jauhiainen et al. |
| 2015/0012737 A1 | 1/2015 | Newell |
| 2015/0074387 A1 | 3/2015 | Lewis |
| 2015/0074392 A1 | 3/2015 | Boivie et al. |
| 2015/0100299 A1 | 4/2015 | Abraham et al. |
| 2015/0200934 A1 | 7/2015 | Naguib |
| 2016/0026810 A1 | 1/2016 | Hagiwara et al. |
| 2016/0065375 A1 | 3/2016 | Kahana et al. |
| 2016/0070932 A1 | 3/2016 | Zimmer et al. |
| 2016/0098283 A1 | 4/2016 | Martinez et al. |
| 2016/0119141 A1 | 4/2016 | Jing et al. |
| 2016/0142772 A1 | 5/2016 | Pinder et al. |
| 2016/0306977 A1 | 10/2016 | Zarakas et al. |
| 2017/0118018 A1 | 4/2017 | Dekker et al. |
| 2017/0132159 A1 | 5/2017 | Joshi et al. |
| 2017/0257365 A1 | 9/2017 | Gonzalez et al. |
| 2017/0329685 A1 | 11/2017 | Jenkins et al. |
| 2017/0364685 A1 | 12/2017 | Shah et al. |
| 2018/0004980 A1 | 1/2018 | Kuczynski et al. |
| 2018/0026969 A1 | 1/2018 | Newton et al. |
| 2018/0069693 A1 | 3/2018 | Boivie et al. |
| 2018/0091311 A1 | 3/2018 | Kisley et al. |
| 2018/0091314 A1 | 3/2018 | Li et al. |
| 2018/0101689 A1 | 4/2018 | Arnold et al. |
| 2018/0109377 A1 | 4/2018 | Fu |
| 2018/0157839 A1* | 6/2018 | Pearson ................. H04L 9/083 |
| 2018/0167268 A1 | 6/2018 | Liguori et al. |
| 2018/0174013 A1 | 6/2018 | Lee |
| 2018/0288011 A1 | 10/2018 | Marquardt et al. |
| 2018/0343110 A1 | 11/2018 | Funk |
| 2018/0367317 A1 | 12/2018 | Forler et al. |
| 2019/0036893 A1 | 1/2019 | Jiang |
| 2019/0080099 A1 | 3/2019 | Roth et al. |
| 2019/0095192 A1* | 3/2019 | Akita .................... G06F 3/1285 |
| 2019/0103961 A1 | 4/2019 | Chhabra et al. |
| 2019/0108332 A1 | 4/2019 | Glew et al. |
| 2019/0124054 A1 | 4/2019 | Zhang et al. |
| 2019/0163910 A1* | 5/2019 | Moon ................. G06F 12/1441 |
| 2019/0213359 A1 | 7/2019 | Kepa et al. |
| 2019/0259029 A1 | 8/2019 | Chilton et al. |
| 2019/0268155 A1 | 8/2019 | Guo |
| 2019/0311126 A1 | 10/2019 | Areno et al. |
| 2019/0334713 A1 | 10/2019 | Fu et al. |
| 2019/0384918 A1* | 12/2019 | Ndu .................... G06F 21/554 |
| 2019/0392151 A1 | 12/2019 | Lee et al. |
| 2020/0026882 A1 | 1/2020 | Fu et al. |
| 2020/0042709 A1 | 2/2020 | Fu et al. |
| 2020/0044841 A1 | 2/2020 | Fu et al. |
| 2020/0074088 A1 | 3/2020 | Fu |
| 2020/0074121 A1 | 3/2020 | Fu |
| 2020/0074122 A1 | 3/2020 | Fu et al. |
| 2020/0104528 A1 | 4/2020 | Fu |
| 2020/0117805 A1 | 4/2020 | Li et al. |
| 2020/0226586 A1 | 7/2020 | Lu et al. |
| 2020/0410097 A1* | 12/2020 | Miller .................... G06F 21/64 |
| 2021/0056066 A1 | 2/2021 | Vijayrao |

FOREIGN PATENT DOCUMENTS

| | | |
|---|---|---|
| CN | 101344904 | 9/2010 |
| CN | 101997834 B | 3/2011 |
| CN | 102438013 | 5/2012 |
| CN | 103856478 | 6/2014 |
| CN | 104778141 A | 7/2015 |
| CN | 106230584 A | 12/2016 |
| CN | 106372487 | 2/2017 |
| CN | 108011716 | 5/2018 |
| CN | 108234115 | 6/2018 |
| CN | 108243009 A | 7/2018 |
| CN | 110795774 | 8/2018 |
| CN | 201810871817.4 | 8/2018 |
| CN | 109614799 A | 4/2019 |
| CN | 106027235 | 5/2019 |
| CN | 109784070 A | 5/2019 |
| JP | 2005275467 A | 10/2005 |
| KR | WO2019098573 A1 | 5/2019 |
| WO | WO2016160597 | 10/2016 |

(56) References Cited

OTHER PUBLICATIONS

Office Action for U.S. Appl. No. 16/529,524, dated Apr. 2, 2021, Fu, "Measurement Processing of High-Speed Cryptographic Operation", 30 Pages.
Office Action for U.S. Appl. No. 16/393,870, dated Apr. 5, 2021, Fu, "Encryption Card, Electronic Device, and Encryption Service Method", 10 Pages.
Office Action for U.S. Appl. No. 16/460,907, dated May 11, 2021, Fu, "Methods and Systems for Activating Measurement Based on a Trusted Card", 22 Pages.
Office Action for U.S. Appl. No. 16/529,582, dated May 26, 2021, "Measurement Methods, Devices and Systems Based on Trusted High-Speed Encryption Card", 9 Pages.
Olzak, "Chapter 8—UEFI and the TPM: Building a foundation for the platform trust", retrieved at <<https://resources.infosecinstitute.com/topic/uefi-andtpm-2>>, Jun. 2012, 18 pgs.
GB, "Information security technology—Trusted computing specification—Motherboard Funcation adn interfae of trusted Platform", Nov. 12, 2013, 414 pages.
Haung et al., "The TPCM 3P3C Defense Architecture of Safety and Trusted Platform," retrieved on Jun. 28, 2019 at http://www.wuj.whu.edu.cn/d/file/allhtml/lx/lx1802/337159b2-52a0-4cb0-a373-26f5bebd3834.htm, vol. 64 No. 2, Apr. 2019 (6 pages).
Intel QAT powers Nginx compression processing—Linux high, retrieved on Jul. 3, 2019 at https://syswift.com/407.html, 21 pages.
PCT Search Report and Written Opinion dated Jul. 30, 2019 for PCT Application No. PCT/US19/28989, 7 pages.
Mamicode.com, "Trusted Execution Technology—Basic Principles," retrieved on Jun. 28, 2019 from http://www.mamicode.com/info-detail-2182008.html, time stamped Feb. 4, 2018 (8 pages).
Office Action for U.S. Appl. No. 16/554,241, dated Jul. 14, 2021, Fu, "Cryptographic Operation Processing Methods, Apparatuses, and Systems", 23 Pages.
Office Action for U.S. Appl. No. 16/393,870, dated Jul. 27, 2021, Fu, "Encryption Card, Electronic Device, and Encryption Service Method", 11 Pages.
Office Action for U.S. Appl. No. 16/586,463, dated Aug. 16, 2021, Fu, "Data Processing Method, Device and System", 19 Pages.
Office Action for U.S. Appl. No. 16/460,907, dated Sep. 21, 2021, Fu, "Methods and Systems for Activating Measurement Based On a Trusted Card", 25 Pages.
Office Action for U.S. Appl. No. 16/554,383, dated Oct. 13, 2021, Fu, "Cryptographic Operation Processing Method, Apparatus, and System, and Method for Building Measurement for Trust Chain", 76 pgs.
Office Action for U.S. Appl. No. 16/554,241, dated Nov. 15, 2021, Fu, "Cryptographic Operation Processing Methods, Apparatuses, and Systems", 24 Pages.
Trusted Platform Module 2.0, Oct. 2017, Microsoft Corporation, 2017, 3 pgs.
Zhang, et al., "A New Approach of TPM Construction Based on J2810", Wuhan University Journal of Natural Sciences, vol. 12, No. 1, https://doi.org/10.1007/s11859-006-0146-6, 2007, 4 pgs.
Office Action for U.S. Appl. No. 16/586,463, dated Feb. 4, 2022, Fu, "Data Processing Method, Device and System", 23 Pages.
English Translation of CN Office Action dated Jan. 6, 2022 for CN Patent Application No. 201810996079.6, 39 pages.
English Translation of CN Search Report dated Nov. 25, 2021 for CN Patent Application No. 201810996079.6, 2 pages.
Extended European Search Report dated Dec. 13, 2021 for European Patent Application No. 19793424.3, 8 pages.
English Translation of CN Office Action dated Dec. 28, 2021 for CN Patent Application No. 201810707787.3, 4 pages.
English Translation of CN Office Action dated Mar. 3, 2022 for CN Patent Application No. 201811143031.7, 13 pages.

* cited by examiner

KEY AND CERTIFICATE DISTRIBUTION METHOD, IDENTITY INFORMATION PROCESSING METHOD, DEVICE, AND MEDIUM

CROSS REFERENCE TO RELATED PATENT APPLICATIONS

This application claims priority to Chinese Patent Application No. 201810707787.3, filed on 2 Jul. 2018 and entitled "Key and Certificate Distribution Method, Identity Information Processing Method, Device, and Medium," which is hereby incorporated by reference in its entirety.

TECHNICAL FIELD

The present application relates to the technical field of data processing, and particularly to key and certificate methods, identity information processing methods, data processing methods, computing devices, and processor-readable storage media.

BACKGROUND

Trusted Computing is a trusted computing platform that is supported by hardware security modules and widely used in computing and communication systems for providing the security of the entire system. A trusted computing chip is a security chip that provides evidence for integrity and authenticity, and is generally physically bound to a computing platform.

Data Encryption converts a plaintext into a ciphertext through an encryption algorithm and an encryption key, while decryption restores the ciphertext to the plaintext through a decryption algorithm and a decryption key. A high-speed encryption chip is a high-performance basic cryptographic device, which is applicable to various types of cryptographic operations, and meets the requirements of data signature/verification, and encryption/decryption, etc., being generally bound to a computing platform strongly through physical means.

After a trusted computing chip is integrated with a high-speed encryption chip, i.e., a trusted high-speed encryption card being formed by a high-speed encryption chip and a trusted computing chip, the integrated chip can not only perform data encryption and decryption, but also perform trusted computing. However, some problems also exist.

The Applicant has found through studies that existing high-speed encryption cards do not have any platform identity key and certificate distribution method. After a trusted computing chip and a reconfigurable high-speed encryption chip are integrated, if an existing method of distributing a platform identity key and a certificate is still used, only the legitimacy of an identity and an associated platform of the trusted computing chip part of the trusted high-speed encryption card can be proven. Due to the re-configurability of the high-speed encryption chip, operational firmware thereof is dynamically reconfigurable. Existing methods of distribution static platform identity keys and certificates cannot prove the legitimacy of an identity and an associated platform of a reconfigurable part.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above problems, the present application is proposed to provide an identity key and certificate distribution method, an identity information processing method, a method, a computing device, and a processor-readable storage medium for data processing, to overcome or at least partially solve the above problems.

According to an aspect of the present application, an identity key and certificate distribution method, which is applied to a privacy certificate issuing authority, includes:

obtaining first process identity information, wherein the first process identity information is used for verifying a user process, the first process identity information includes a process identity key, and the first process identity information is generated based on a target operational firmware that is preloaded on a reconfigurable chip and a fixed operational firmware of a non-reconfigurable chip, and the non-reconfigurable chip and the reconfigurable chip form an integrated chip;

determining legitimacy of an operational firmware of the integrated chip based on the first process identity information;

generating a platform identity certificate used for verifying the user process based on the target operational firmware and the fixed operational firmware; and providing the platform identity certificate to the user process for verifying legitimacy of an identity of the user process.

Correspondingly, according to another aspect of the present application, an identity information processing method is further provided. The method includes:

obtaining customized information of a user process on an integrated chip, wherein the integrated chip includes a non-reconfigurable chip and a reconfigurable chip;

determining a target operational firmware preloaded on the reconfigurable chip according to the customized information;

generating first process identity information used for verifying the user process according to the target operational firmware and a fixed operational firmware of the non-reconfigurable chip; and providing the first process identity information to a privacy certificate issuing authority for performing firmware legitimacy verification of the operational firmware to determine an identity of the user process to be legitimate according to a result of the firmware legitimacy verification.

In implementations, the operational firmware includes one or more operational algorithms, wherein the customized information includes a preloaded firmware identification, the preloaded firmware identification corresponds to at least one operational algorithm, and the method further includes:

generating respective preloaded firmware identifications corresponding to a plurality of operational algorithms of the operational firmware according to a preloaded firmware identification corresponding to each operational algorithm.

In implementations, the customized information includes a preloaded firmware identification, and generating the first process identity information used for verifying the user process based on the target operational firmware and the fixed operational firmware of the non-reconfigurable chip includes:

generating a firmware unique identification used for labeling the target operational firmware and the fixed operational firmware of the non-reconfigurable chip; and generating the first process identity information based on an integrated chip identification, the preloaded firmware identification, and the firmware unique identification.

In implementations, the customized information further includes a process identification and a platform identification, and generating the first process identity information based on the integrated chip identification, the preloaded firmware identification of the target operational firmware, and the firmware unique identification includes:

encrypting the firmware unique identification using a private key of the integrated chip; and encrypting a process identity public key that is generated by the integrated chip, the preloaded firmware identification, the integrated chip identification, the encrypted firmware unique identification, the process identification, and the platform identification using a process identity private key generated by the integrated chip, to obtain the first process identity information.

In implementations, the customized information further includes a first random number, and before generating the first process identity information based on the integrated chip identification, the preloaded firmware identification of the target operational firmware, and the firmware unique identification, the method further includes:

generating a second random number; and generating a process identity public key and a process identity private key based on the first random number, the second random number, and the process identification, wherein the process identity private key is stored on the integrated chip.

In implementations, the customized information is encrypted using a public key of the integrated chip, and the method further includes:

decrypting the customized information using a private key of the integrated chip, wherein generating the process identity public key based on the first random number, the second random number, and the process identification includes:

encrypting the first random number, the second random number, and the process identification using the private key of the integrated chip to generate the process identity public key, and providing the process identity public key to the privacy certificate issuing authority through the user process.

In implementations, the method further includes:

generating integrated chip identity information based on the integrated chip identification, the public key of the integrated chip, and a chip producer identification, and providing the integrated chip identity information to the privacy certificate issuing authority through the user process.

In implementations, the integrated chip identity information is encrypted using the first random number, and the process identification and the integrated chip identity information obtained by decryption using the first random number are encrypted by the user process using a public key of the privacy certificate issuing authority, and provided to the privacy certificate issuing authority.

In implementations, when the user process obtains the first random number after using the public key of the integrated chip to decrypt the process identity public key, and a first integrated chip identification that is obtained by decrypting the first process identity information using the process identity public key is consistent with a second integrated chip identification that is obtained by decrypting the integrated chip identity information, the first process identity information, the process identity public key, the process identification, the platform identification, and the integrated chip identity information are provided by the user process to the privacy certificate issuing authority.

In implementations, the customized information includes a first random number, and the method further includes:

obtaining second process identity information encrypted by a public key of the integrated chip;

decrypting the second process identity information using a private key of the integrated chip;

encrypting the second process identity information using the first random number and providing the encrypted second process identity information to the user process.

In implementations, the encrypted second process identity information is forwarded to the integrated chip through the user process, and the user process decrypts the second process identity information using the first random number.

Correspondingly, according to another aspect of the present application, an identity information processing method is further provided. The method includes:

obtaining first process identity information, wherein the first process identity information is used for verifying a user process, and the first process identity information is generated based on a target operational firmware that is pre-loaded on a reconfigurable chip and a fixed operational firmware of a non-reconfigurable chip, the non-reconfigurable chip and the reconfigurable chip form an integrated chip; and determining that the operational firmware of the integrated chip is legitimate according to the first process identity information.

In implementations, after determining that the operational firmware of the integrated chip is legitimate according to the first process identity information, the method further includes:

generating second process identity information used for verifying the user process based on the target operational firmware and the fixed operational firmware; and providing the second process identity information to the user process for verifying the legitimacy of an identity of the user process.

In implementations, the first process identity information further includes a process identification and a platform identification, wherein the second process identity information includes a platform identity certificate, and generating the second process identity information used for verifying the user process based on the target operational firmware and the fixed operational firmware includes:

encrypting a process identity public key generated by the integrated chip, a preloaded firmware identification of the target operational firmware, an integrated chip identification, and a firmware unique identification used for labeling the target operational firmware and the fixed operational firmware, the process identification, and the platform identification using a private key of a privacy certificate issuing authority to obtain the platform identity certificate.

In implementations, the first process identity information includes a preloaded firmware identification and an integrated chip identification, and determining that the operational firmware of the integrated chip is legitimate according to the first process identity information includes:

determining that the target operational firmware and the fixed operational firmware are legitimate based on the preloaded firmware identification and the integrated chip identification.

In implementations, before determining that the target operational firmware and the fixed operational firmware are legitimate based on the preloaded firmware identification and the integrated chip identification, the method further includes:

obtaining a process identity public key;

decrypting the first process identity information using the process identity public key to obtain the preloaded firmware identification, the integrated chip identification, and a firmware unique identification used for labeling the target operational firmware and the fixed operational firmware.

In implementations, determining that the target operational firmware and the fixed operational firmware are legitimate based on the preloaded firmware identification and the integrated chip identification includes:

searching for a firmware unique identification on the privacy certificate issuing authority according to the pre-loaded firmware identification and the integrated chip identification; and comparing a firmware unique identification obtained from decryption with the firmware unique identification that is found to verify the legitimacy of the target operational firmware and the fixed operational firmware.

In implementations, the method further includes:

obtaining integrated chip identity information; and verifying the legitimacy of integrated chip identity information using a chip production private key.

In implementations, the integrated chip identity information and the process identification are encrypted by the user process using a public key of the privacy certificate issuing authority, and then provided to the privacy certificate issuing authority, wherein obtaining the integrated chip identity information includes:

performing decryption using a private key of the privacy certificate issuing authority to obtain the integrated chip identity information and a first process identification.

The method further includes:

decrypting the process identity public key using a public key of the integrated chip to obtain a second process identification; and comparing the first process identification with the second process identification, determining that the process identity public key and integrated chip identity information are generated for a same user process.

In implementations, the first process identity information includes a process identification, and the method further includes:

decrypting the first process identity information using the process identity public key to obtain the preloaded firmware identification, the integrated chip identification, and a third process identification; and comparing the first process identification with the third process identification, and comparing the integrated chip identity information with the pre-loaded firmware identification and the integrated chip identification obtained by decrypting the first process identity information, to determine that the process identity public key and the process identity private key are generated for the process identification by an legitimate integrated chip.

Correspondingly, according to another aspect of the present application, an identity information processing method is further provided. The method includes:

providing customized information to an integrated chip, to allow determination of a target operational firmware preloaded on a reconfigurable chip according to the customized information, and generation of first process identity information used for verifying a user process based on the target operational firmware and a fixed operational firmware of a non-reconfigurable chip, wherein the integrated chip includes the non-reconfigurable chip and the reconfigurable chip;

obtaining the first process identity information returned by the integrated chip; and providing the first process identity information to a privacy certificate issuing authority for performing a firmware legitimacy verification of the operational firmware to determine that an identity of the user process is legitimate according to a result of the firmware legitimacy verification.

In implementations, the customized information includes a first random number, and the method further includes:

obtaining integrated chip identity information provided by the integrated chip, the integrated chip identity information being encrypted by the first random number;

decrypting the integrated chip identity information using the first random number; and encrypting the integrated chip identity information using a public key of the privacy certificate issuing authority and providing the encrypted integrated chip identity information to the privacy certificate issuing authority.

In implementations, the method further includes:

decrypting a process identity public key using a public key of the integrated chip to obtain the first random number;

decrypting the first process identity information using the process identity public key to obtain a first integrated chip identification;

decrypting the integrated chip identity information to obtain a second integrated chip identification; and if the first integrated chip identification is consistent with the second integrated chip identification, providing the first process identity information, the process identity public key, a process identification, a platform identification, and the integrated chip identity information to the privacy certificate issuing authority.

Correspondingly, according to another aspect of the present application, a data processing method is also provided, which includes:

determining, by a first computing device, a target processor, wherein the target processor includes a first sub-processor and a second sub-processor;

obtaining, by the first computing device, metadata of the target processor corresponding to a target process;

determining, by the first computing device, a fixed operational firmware of the first sub-processor and a target operating firmware of the second sub-processor according to the metadata;

generating, by the first computing device, identity information of the target process according to the target operational firmware and the fixed operational firmware, wherein the identity information is used for performing a first verification of the fixed operational firmware or the target fixed operational firmware; and sending, by the first computing device, the identity information to a second computing device.

Correspondingly, according to another aspect of the present application, a data processing method is also provided, which includes:

obtaining, by a second computing device, identity information of a target process, wherein a first computing device determines a target processor, obtains metadata of the target processor corresponding to the target process, determines a fixed operational firmware of the first sub-processor and a target operational firmware of the second sub-processor according to the metadata, and generates the identity information based on the target operational firmware and the fixed operational firmware;

performing, by the second computing device, a first verification on the fixed operational firmware or the target operational firmware based on the identity information; and determining, by the second computing device, whether the identity information satisfies a preset condition according to a result of the first verification.

Correspondingly, according to another aspect of the present application, a data processing method is also provided, which includes:

determining a target processor, wherein the target processor includes a first sub-processor and a second sub-processor, and the target processor includes metadata corresponding to a target process;

determining a fixed operational firmware of the first sub-processor and a target operational firmware of the second sub-processor according to the metadata;

generating identity information of the target process according to the target operational firmware and the fixed operational firmware;

performing a first verification on the fixed operational firmware or the target operational firmware based on the identity information; and determining whether the identity information satisfies a preset condition according to a result of the first verification.

Correspondingly, according to another aspect of the present application, an identity information distribution system is further provided. The distribution system includes an integrated chip, a user process, and a privacy certificate issuing authority.

The integrated chip is configured to obtain customized information of the user process for the integrated chip, wherein the integrated chip includes a non-reconfigurable chip and a reconfigurable chip; determine a target operational firmware preloaded on the reconfigurable chip according to the customized information; generate first process identity information used for verifying the user process based on the target operational firmware and a fixed operational firmware of the non-reconfigurable chip; and provide the first process identity information to the privacy certificate issuing authority for performing firmware legitimacy verification of a operational firmware to determine that an identity of the user process is legitimate according to a result of the legal firmware legitimacy verification.

The privacy certificate issuing authority is configured to obtain the first process identity information, wherein the first process identity information is used for verifying the user process, and the first process identity information is generated based on the target operational firmware preloaded on the reconfigurable chip and the fixed operational firmware of a non-reconfigurable chip, and the non-reconfigurable chip and the reconfigurable chip constitute the integrated chip; and determine that the operational firmware of the integrated chip is legitimate according to the first process identity information.

The user process is configured to provide the customized information to the integrated chip, to determine the target operational firmware preloaded on the reconfigurable chip according to the customized information, and to generate first process identity information used for verifying the user process based on the target operational firmware and the fixed operational firmware of the non-reconfigurable chip, wherein the integrated chip includes the non-reconfigurable chip and the reconfigurable chip; obtain the first process identity information returned by the integrated chip; provide the process identity information to the privacy certificate issuing authority for performing firmware legitimacy verification of the operational firmware to determine that the identity of the user process is legitimate according to the result of the firmware legitimacy verification.

Correspondingly, according to another aspect of the present application, a computing device is further provided, which includes a memory, a processor, and a computer program stored on the memory and operable on the processor, the processor executing the computer program to implement one or more of the methods described above.

Correspondingly, according to another aspect of the present application, a processor-readable storage medium is further provided, which stores a computer program that, when executed by a processor, implements one or more of the methods described above.

According to the embodiments of the present application, by obtaining information of an integrated chip customized by a user process, and a target operational firmware preloaded on a reconfigurable chip is determined according to the customized information. First process identity information used for verifying the user process is then generated based on the target operational firmware and a fixed operational firmware of a non-reconfigurable chip. The first process identity information is then provided to a privacy certificate issuing authority for performing a firmware legitimacy verification of an operational firmware to determine that an identity of the user process is legitimate according to a result of the firmware legitimacy verification. As such, the first process identity information generated for the user process by the integrated chip can prove the legitimacy of the fixed operational firmware of the non-reconfigurable part of the firmware, and also prove the legitimacy of the target operational firmware of the reconfigurable part. In case when the operational firmware of the integrated chip is dynamically changed, the problem that the legitimacy of the entire integrated chip cannot be verified is solved.

Furthermore, by obtaining second process identity information encrypted by a public key of the integrated chip, the second process identity information is decrypted using a private key of the integrated chip. The second process identity information is encrypted using a first random number, and provided to the user process. After the privacy certificate issuing authority verifies the legitimacy of the operational firmware of the integrated chip, the integrated chip decrypts the second process identity information provided by the privacy certificate issuing authority, to allow the user process to prove the legitimacy of the entire integrated chip by using the second process identity information.

The above description is only an overview of the technical solutions of the present application, and is used to enable a better understanding of the technical means of the present application, which can be implemented according to the content of the specification. Furthermore, in order to enable an easier and clearer understanding of the above and other objectives, features and advantages of the present application, specific embodiments of the present application are exemplified hereinafter.

BRIEF DESCRIPTION OF THE DRAWINGS

By reading the detailed description of exemplified embodiments as follows, a variety of other advantages and benefits will become apparent to one of ordinary skill in the art. Accompanying drawings are merely used for the purpose of illustrating the preferred embodiments and are not intended to impose limitations on the present application. Throughout the drawings, the same reference numerals are used to refer to the same components. In the drawing.

DETAILED DESCRIPTION

Figure 1:
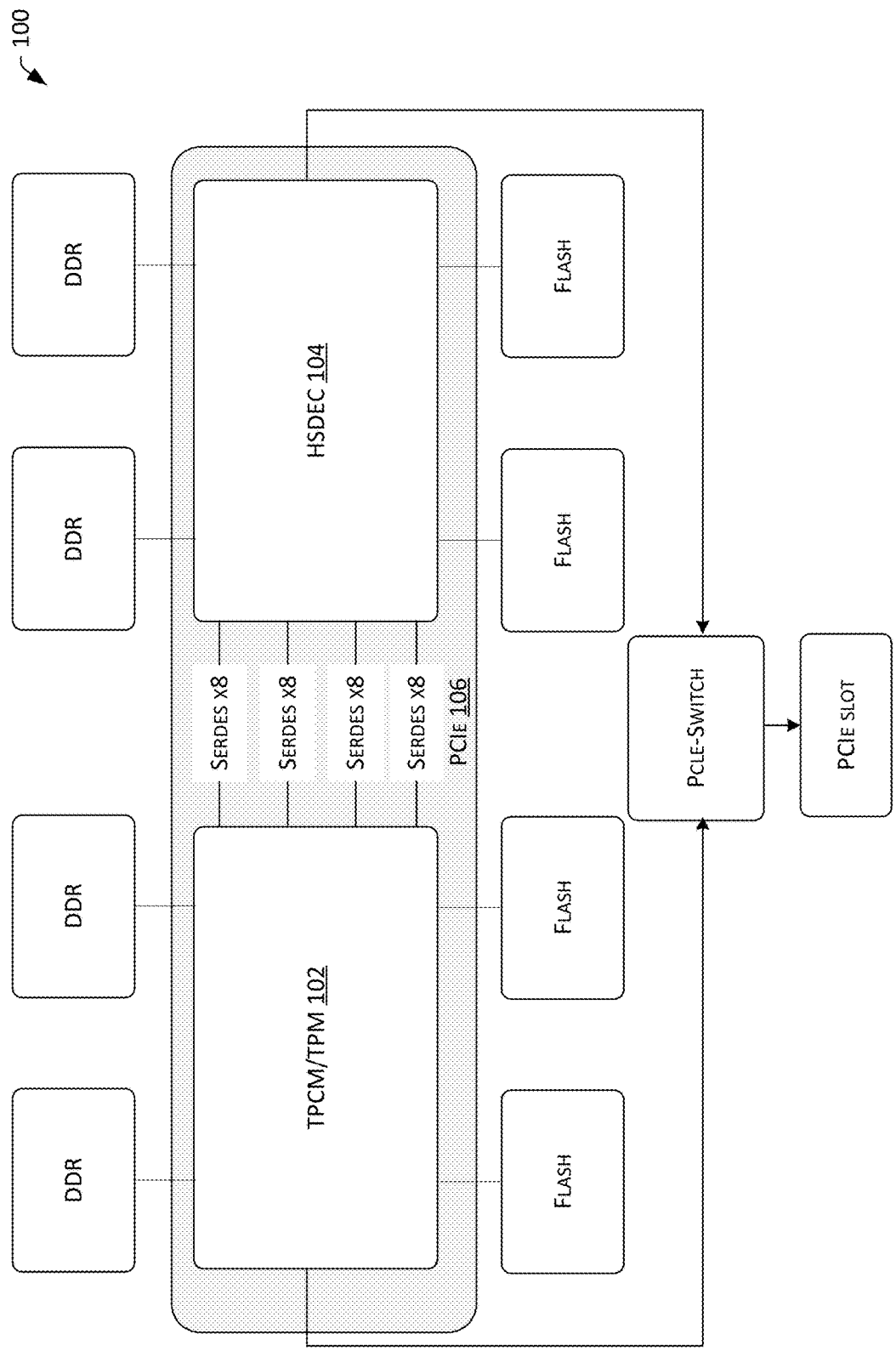
FIG. 1 illustrates a structural block diagram of a trusted high speed data encryption card.

Exemplary embodiments of the present disclosure will be described in more detail hereinafter with reference to the accompanying drawings. Although illustrative embodiments of the present disclosure are shown in the drawings, it should be understood that the present disclosure can be implemented in a variety of different ways, and is not limited by the described embodiments. Rather, these embodiments are provided so that the present disclosure will be more fully understood, and the scope of the present disclosure will be fully conveyed to one skilled in the art.

To enable one skilled in the art to understand the present application in a better manner, concepts involved in the present application are described below:

An integrated chip includes a non-reconfigurable chip and a reconfigurable chip, and the non-reconfigurable chip and the reconfigurable chip are integrated in the integrated chip to realize the purpose of integrating functions of these two parts into one chip. Specifically, any suitable methods of integration can be used, which are not limited by the embodiments of the present application. An operational firmware on a reconfigurable chip can be dynamically loaded, and a circuit is generated according to needs for computation. An operational firmware on a reconfigurable chip is fixed, and cannot be changed after leaving the factory.

An operational firmware is loaded or fixed on an integrated chip, and the operational firmware is used for performing various operations, for example, an operational firmware responsible for trusted computing, an operational firmware responsible for high-speed encryption and decryption, etc., or any other applicable operational firmware. The present application does not have any limitations thereon.

For example, FIG. 1 shows a structural block diagram of a Trusted High-Speed Data Encryption Card (THSDEC) 100, i.e., an integrated chip, which includes a trusted computing chip (Trusted Platform Computing Module/Trusted Platform Module, TPCM/TPM) 102 and a high-speed data encryption card (HSDEC) 104. By referring to standard requirements of "GB/T 29827-2013 Information Security Technology—Trusted Computing Specification—Privacy Certificate Issuing Authority Motherboard Functional Interface", and a trusted chip design of TPCM/TPM, the trusted computing chip and the high-speed encryption card are integrated into a PCIe card 106. The trusted computing chip and the high-speed encryption chip can conduct communications directly through a circuit inside a board without the need of mapping through memory of a host machine, thus improving the speed of data transmission. The high-speed encryption card can be implemented based on an FPGA (Field-Programmable Gate Array). FPGA is a programmable logic device with high performance and low power consumption and having reconfigurable characteristics. A circuit can be directly generated therefrom to perform computations of an algorithm. A targeted design can be made based on an algorithm and algorithmic indicators, having very high efficiencies of execution and computation, and being suitable for online identification system that is concerned with an efficiency of execution.

Operational firmware on an integrated chip can be divided into two categories. An operational firmware loaded on a reconfigurable chip is recorded as a target operational firmware, which can be dynamically loaded as needed. An operational firmware that is fixed on a non-reconfigurable chip is recorded as a fixed operational firmware solidified, and statically cured on the chip.

For example, a high-speed encryption chip (i.e., a reconfigurable chip) part of a trusted high-speed data encryption card THSDEC 100 (i.e., an integrated chip) is responsible for high-speed encryption and decryption, with its cryptographic encryption and decryption performance being largely related to its cryptographic operational firmware. For example, configuring a type of cryptographic algorithm is better than the encryption and decryption performance of multiple cryptographic algorithms. The present application proposes a solution for customizing a loaded cryptographic firmware to meet requirements of customized cryptographic operations of services, i.e., different cryptographic operational firmware can be loaded according to service requirements.

A user process that invokes an integrated chip can issue customized information to the integrated chip to request the integrated chip to generate first process identity information that is used for verifying the user process for the user process. The customized information may be used for determining a target operational firmware preloaded on a reconfigurable chip of the integrated chip. For example, the customized information may include a preloaded firmware identification, and may also include an identification of the user process, a platform identification, a first random number, etc., or any other applicable information, which are not limited by the embodiments of the present application.

For example, a user process may use a public key EK encrypted information set of an integrated chip, and the encrypted information set includes an identification L of the user process, a preloaded firmware identification H_ID, an identification PCA of an privacy certificate issuing authority, and a first random number N1. The encrypted information set (i.e., customized information) is sent to a trusted high speed data encryption card THSDEC (i.e., the integrated chip).

An integrated chip generates first process identity information for a user process, which is used for verifying the legitimacy of the user process. Specifically, the first process identity information needs to be provided to a privacy certificate issuing authority, and the privacy certificate issuing authority verifies the legitimacy of an operational firmware of the integrated chip based on the first process identity information. If the operational firmware of the integrated chip is legitimate, this indicates that an identity of the user process that invokes the integrated chip is legitimate, and a platform certificate issued by the privacy certificate issuing authority can be issued therefor. The first process identity information is used for proving the identity of the user process, and may include a firmware unique identification of a target operational firmware and a fixed operational firmware, and may also include an integrated chip identification, a preloaded firmware identification, a process identity public key, a platform identification, a process identification, etc. Any applicable information may be included, which is not limited by the embodiments of the present application.

A privacy certificate issuing authority is configured to verify the legitimacy of a user process. Specifically, an operational firmware of an integrated chip can be determined to be legitimate based on first process identity information generated for the user process by the integrated chip, i.e., an identity of the user process that invokes the integrated chip is determined to be legitimate. The privacy certificate issuing authority is a trusted third party, and can be implemented by an enterprise management and control platform, or can be implemented by a third-party CA (a certificate issuer) center, or any other applicable platform. The embodiments of the present application do not have any limitations thereon.

A user process, an integrated chip and a privacy certificate issuing authority can form an identity information distribution system, which is used for distributing identity information of a user process. Specifically, the integrated chip generates first process identity information for a user process, and the user process provides the first process identity information to the privacy certificate issuing authority. The privacy certificate issuing authority can determine the legitimacy of an identity of the user process based on the first process identity information. The privacy certificate issuing authority may also generate second process identity information (for example, a platform identity certificate issued by a platform) for the user process, and then return the second process identity information to the user process for the user process to prove the identity thereof to other parties.

In implementations, a privacy certificate issuing authority may generate second process identity information for a user process. The second process identity information is used for proving that an identity of the user process has been verified by the privacy certificate issuing authority as legitimate. The second process identity information may include a firmware unique identification of a target operational firmware and a fixed operational firmware, and may also include an integrated chip identification, a preloaded firmware identification, a process identity public key, a platform identification, a process identification, etc. Specifically, any applicable information may be included, which is not limited by the embodiments of the present application. The second process identity information and the first process identity information may include the same information, but keys used for encryption are different. The first process identity information is encrypted using a process identity private key, and the second process identity information is encrypted using a private key of the privacy certificate issuing authority.

The second process identity information includes a platform identity certificate. The platform identity certificate is used for verifying the identity of the user process. The platform identity certificate includes a certificate obtained by encrypting the first process identity information using the private key of the privacy certificate issuing authority, or any other applicable certificate that can be used for proving the identity of the process, which is not limited by the embodiments of the present application.

In implementations, an operational firmware includes one or more operational algorithms, such as SM2 (a public key crypto engine), SM3 (a hash algorithm engine), SM4 (a symmetric cryptographic engine), RSA (a random number engine), the AES (an international symmetric algorithm engine), etc., or any other applicable operational algorithm, which are not limited by the embodiments of the present application. The customized information includes a preloaded firmware identification, which is an identity label corresponding to an operational firmware that is loaded by the reconfigurable chip. In other words, the reconfigurable chip part may include one or more operational firmware, and one or more operational firmware corresponding to different preloaded firmware identifications.

For example, if the high-speed encryption chip (i.e., the reconfigurable chip) of the trusted high-speed data encryption card THSDEC (i.e., the integrated chip) contains only a SM1 cryptographic firmware, its preloaded firmware is identified as H_1. If the high-speed encryption chip contains a SM2 cryptographic firmware, its preloaded firmware identification is H_2. If the high speed encryption chip contains cryptographic operation firmware of both SM2 and SM3 cryptographic algorithms, a preloaded firmware identification is H_2∥4, etc., and so on. Different cryptographic operational firmware has different preloaded firmware identifications.

In implementations, a preloaded firmware identification corresponds to one or more operational algorithms, wherein an operational algorithm designs a preloaded firmware identification, and preloaded firmware identifications corresponding to a plurality of operational algorithms can be generated by a preloaded firmware identification corresponding to a single operational algorithm. For example, a preloaded firmware identification of an operational firmware including a plurality of operational algorithms is obtained from calculation of a preloaded firmware identification corresponding to each operational algorithm according to certain algorithm rule(s). For example, a preloaded firmware identification corresponding to a SM2 cryptographic algorithm is H_2, and a preloaded firmware identification corresponding to a SM4 cryptographic algorithm is H_4. An example of operation is to multiply two numbers. As such, a preloaded firmware identification of a cryptographic operational firmware having SM2 and SM4 is H_8.

In implementations, a firmware unique identification includes a hash value obtained by hashing an associated operational firmware, or any other applicable identification that can uniquely identify the firmware, which is not limited by the embodiments of the present application. For example, T-H_ID-T-Firmware indicates a trusted high-speed data encryption card THSDEC (i.e., an integrated chip), T-H_ID (i.e., an integrated chip identification) is fixed operational firmware that is not reconfigurable after release, and such firmware is determined at release. H_ID-Firmware refers to a reconfigurable target operational firmware of the integrated chip, which is related to a cryptographic operational firmware to be loaded, i.e., a pre-loaded firmware identification H_ID is used to determine content of the firmware. Hashing is performed for the fixed operational firmware T-H_ID-T-Firmware and the target operational firmware H_ID-Firmware to obtain a firmware unique identification hash (T-H_ID-T-Firmware||H_ID-Firmware).

An integrated chip identification is a unique identification of an integrated chip, and the integrated chip identification is unchanged regardless of how a target operational firmware that is loaded by a reconfigurable chip portion of the integrated chip is changed. Therefore, the integrated chip identification can only be used as an identification for a fixed operational firmware that is cured on a non-reconfigurable chip.

For example, an integrated chip identification, a preloaded firmware identification, and a firmware mapping relational database thereof can be represented in Table 1:

| Integrated chip identification T-H_ID | Preloaded firmware identification H-ID | Firmware unique identification (T-H_ID-T-Firmware|| H_ID-Firmware) | Description of cryptographic module |
|---|---|---|---|
| T-H_1 | H_1 | Hash(T-H_1-T-Firmware ||SM1) | T-H_1 security chip having SM1 cryptographic module |
| T-H_2 | H_2 | Hash(T-H_2-T-Firmware ||SM2) | T-H_2 security chip having SM2 cryptographic module |
| T-H_2 | H_3 | Hash(T-H_2-T-Firmware ||SM2|SM3) | T-H_2 security chip having SM2 and SM3 cryptographic modules |

In implementations, an integrated chip may generate a process identity private key and a process identity public key for a user process, wherein the process identity private key is maintained in the integrated chip, and is used for encrypting first process identity information. The process identity public key can be provided to a privacy certificate issuing authority to enable a decryption of the first process identity information.

In implementations, the privacy certificate issuing authority may be provided with integrated chip identity information in addition to the first process identity information being provided to the privacy certificate issuing authority. The integrated chip identity information includes evidence for the legitimacy of an identity of the integrated chip, which in fact can only prove the legitimacy of a non-reconfigurable part thereof. The integrated chip identity information can be generated based on the integrated chip identification, a public key of the integrated chip, and a chip producer identification (i.e., a manufacturer identification). An example is an endorsement certificate, $Cert\_EK=[T-H\_ID, EK, MF]_{SK(MF)}$, of a trusted high-speed data encryption card THSDEC (i.e., an integrated chip), wherein T-H_ID is an integrated chip identification, MF is an identity producer identification (i.e. a manufacturer identification), EK is a public key of the integrated chip (i.e., an endorsement public key that is generated for the integrated chip by an associated chip manufacturer when the chip is shipped), SK(MF) is a private key of the manufacturer, indicating the use of the private key SK(MF) of the manufacturer for encrypting three types of information T-H_ID, EK, and MF.

Figure 2:
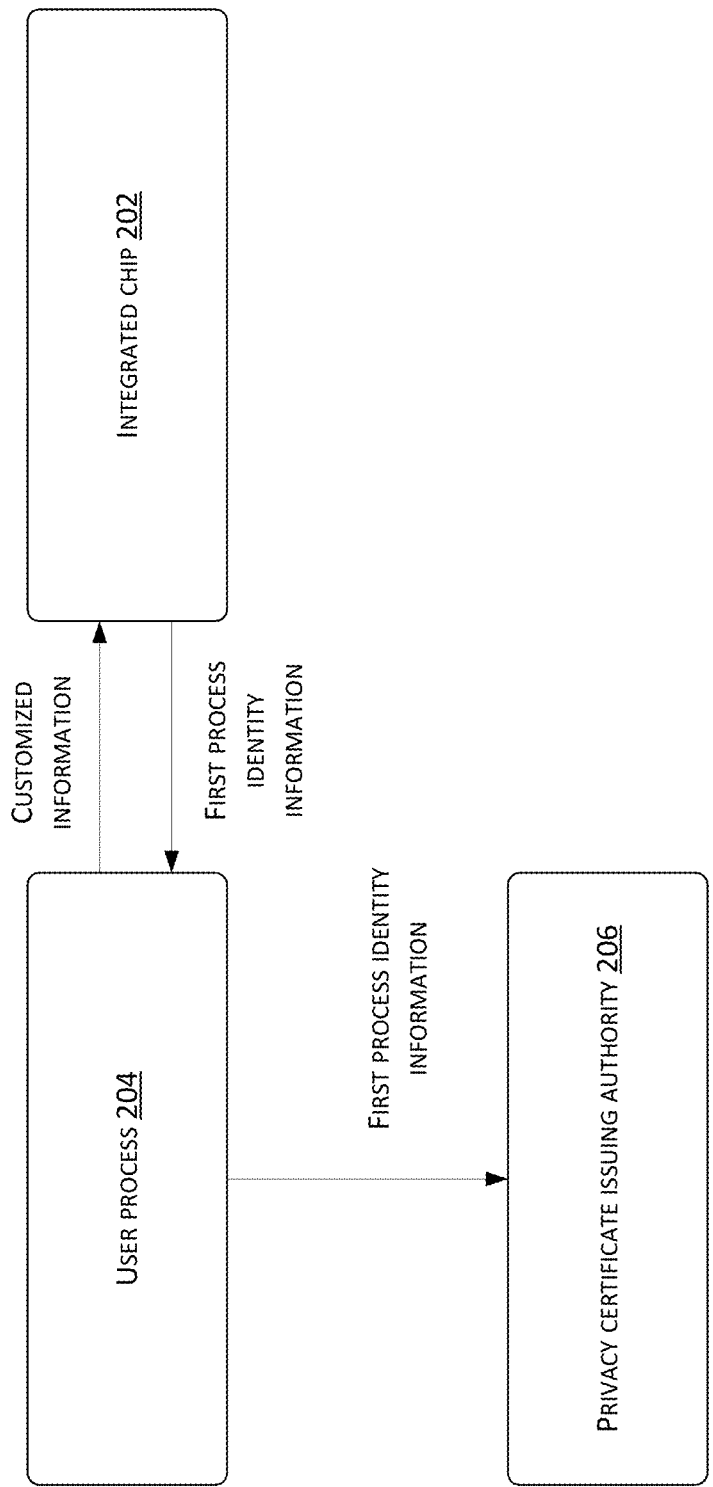
FIG. 2 illustrates a schematic diagram of a process of distributing identity information.

According to an embodiment of the present application, since a high-speed encryption chip in an integrated chip is reconfigurable, an operational firmware thereof is dynamically loaded. Existing methods of distributing static platform identity keys and certificates cannot prove an identity of the reconfigurable part and the legitimacy of a platform. As shown in a schematic diagram of an identity information distribution process in FIG. 2, the present application provides a first process identity information processing mechanism of an integrated chip, which obtains information of an integrated chip 202 customized by a user process 204, and determines a target operational firmware preloaded on a reconfigurable chip according to the customized information, generates first process identity information used for verifying the user process 204 according to the target operational firmware and a fixed operational firmware of a non-reconfigurable chip, and provides the first process identity information to a privacy certificate issuing authority 206 for performing a firmware legitimacy verification of an operational firmware to determine the legitimacy of an identity of the user process 204 according to a result of the firmware legitimacy verification. As such, the first process identity information that is generated for the user process 204 by the integrated chip 202 can prove the legitimacy of the fixed operational firmware of the non-reconfigurable part, and can also prove the legitimacy of the target operational firmware of the reconfigurable part. In case when the operational firmware of an integrated chip is dynamically changed, the problem that the legitimacy of the entire integrated chip cannot be verified is solved. The present application is applicable to, but is not limited to, the application scenarios as described above.

Figure 3:
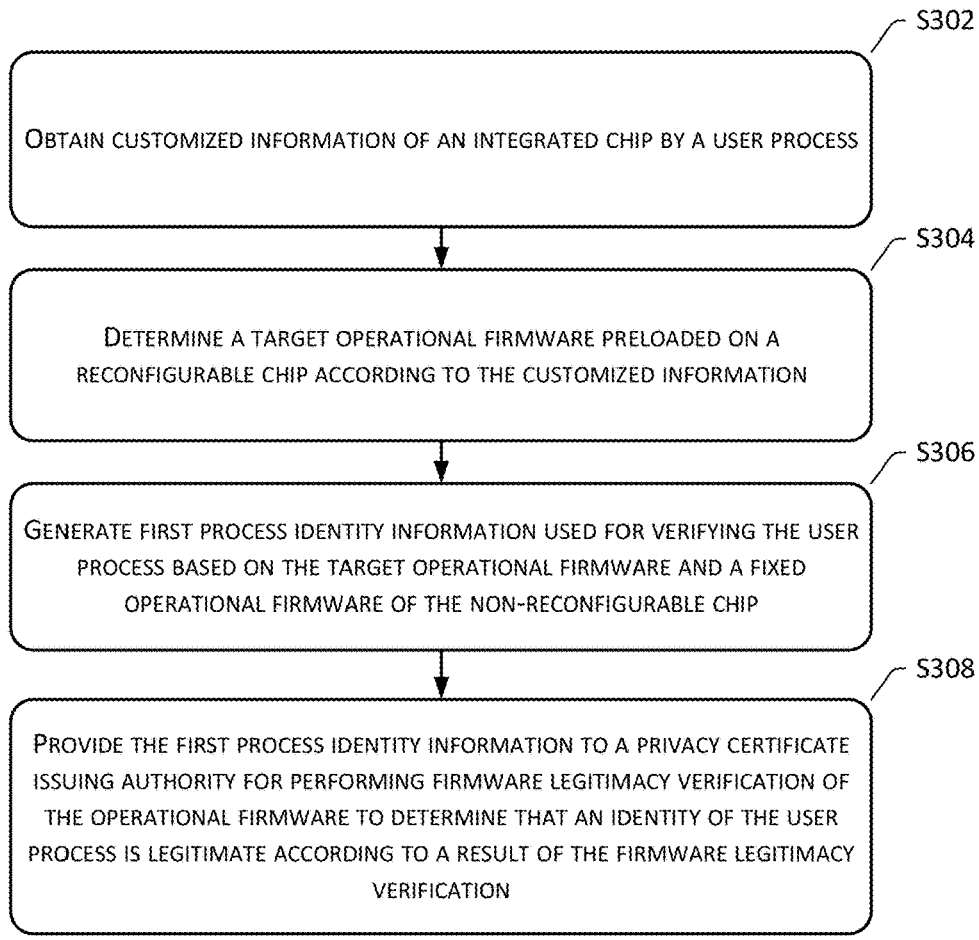
FIG. 3 illustrates a flowchart of an embodiment of an identity information processing method according to the first embodiment of the present application.

Referring to FIG. 3, a flowchart of an embodiment of an identity information processing method 300 according to the first embodiment of the present application is shown. The method 300 may include the following operations S302: Obtain customized information of an integrated chip by a user process.

In implementations, the user process may send the customized information to the integrated chip. Sending may be performed in an encrypted manner or an unencrypted manner, or any other applicable manner, which is not limited by the embodiments of the present application. For example, a user process U uses a public key EK of an integrated chip (i.e., an endorsement public key generated by a chip manufacturer for the integrated chip) to encrypt an information set [L, H_ID, PCA, N1 (i.e., a first random number)], which is sent to a trusted high-speed data encryption card THSDEC (i.e., the integrated chip), i.e., which is alike the integrated chip initiating the customized information.

S304: Determine a target operational firmware preloaded on a reconfigurable chip according to the customized information.

In implementations, the customized information includes requirement(s) of the user process for the target operational firmware preloaded on the reconfigurable chip, for example, a preloaded firmware identification H_ID included in the customized information. Based thereon, the integrated chip can determine a corresponding target operational firmware, thus implementing a dynamic loading of the operational firmware.

S306: Generate first process identity information used for verifying the user process based on the target operational firmware and a fixed operational firmware of the non-reconfigurable chip.

In implementations, the target operational firmware is dynamically loaded. To prove the legitimacy of the entire integrated chip, it is necessary to generate the first process identity information according to the target operational firmware and the fixed operational firmware. In existing distribution methods of static platform identity keys and certificates, the generation of identity information is unrelated to the reconfigurable part of the dynamic loading, thus resulting in the problem of being able to prove the legitimacy of the non-reconfigurable part only.

A plurality of different ways of generating the first process identity information may exist. For example, first process identity information is generated based on an integrated chip identification, a preloaded firmware identification, and a firmware unique identification. Alternatively, the first process identity information is generated based on a process identity public key generated according to the integrated chip, and the preloaded firmware identification, the integrated chip identification, an encrypted firmware unique identification, a process identification, and a platform identification, or any other applicable generation manner. The embodiments of the present application do not have any limitations thereon.

S308: Provide the first process identity information to a privacy certificate issuing authority for performing firmware legitimacy verification of the operational firmware to determine that an identity of the user process is legitimate according to a result of the firmware legitimacy verification.

In implementations, the first process identity information is provided to the privacy certificate issuing authority after being generated by the integrated chip, which may be provided to the privacy certificate issuing authority through the user process, or any other applicable manner. The embodiments of the present do not have any limitations thereon. The privacy certificate issuing authority stores information related to operational firmware on legitimate integrated chips. By comparing information included in the first process identity information therewith, a determination can be made whether the operational firmware on the integrated chip invoked by the user process is legitimate. If being legitimate, the identity of the user process is legitimate.

For example, the privacy certificate issuing authority PCA stores integrated chip identifications, preloaded firmware identifications, and a firmware mapping relationship database thereof. According to the integrated chip identification and the preloaded firmware identification included in the first process identity information, the firmware unique identification of the integrated chip (the reconfigurable chip and the non-reconfigurable chip) stored on the privacy certificate issuing authority can be found in the database. If the firmware unique identification in the first process identity information is consistent with the found firmware unique identification, a determination is made that the operational firmware is legitimate. Otherwise, the operational firmware is illegitimate, and the identity information distribution process is terminated.

According to the embodiments of the present application, by obtaining information of an integrated chip customized by a user process, and a target operational firmware preloaded on a reconfigurable chip is determined according to the customized information. First process identity information used for verifying the user process is then generated based on the target operational firmware and a fixed operational firmware of a non-reconfigurable chip. The first process identity information is then provided to a privacy certificate issuing authority for performing a firmware legitimacy verification of an operational firmware to determine that an identity of the user process is legitimate according to a result of the firmware legitimacy verification. As such, the first process identity information generated for the user process by the integrated chip can prove the legitimacy of the fixed operational firmware of the non-reconfigurable part of the firmware, and also prove the legitimacy of the target operational firmware of the reconfigurable part. In case when the operational firmware of the integrated chip is dynamically changed, the problem that the legitimacy of the entire integrated chip cannot be verified is solved.

Figure 4:
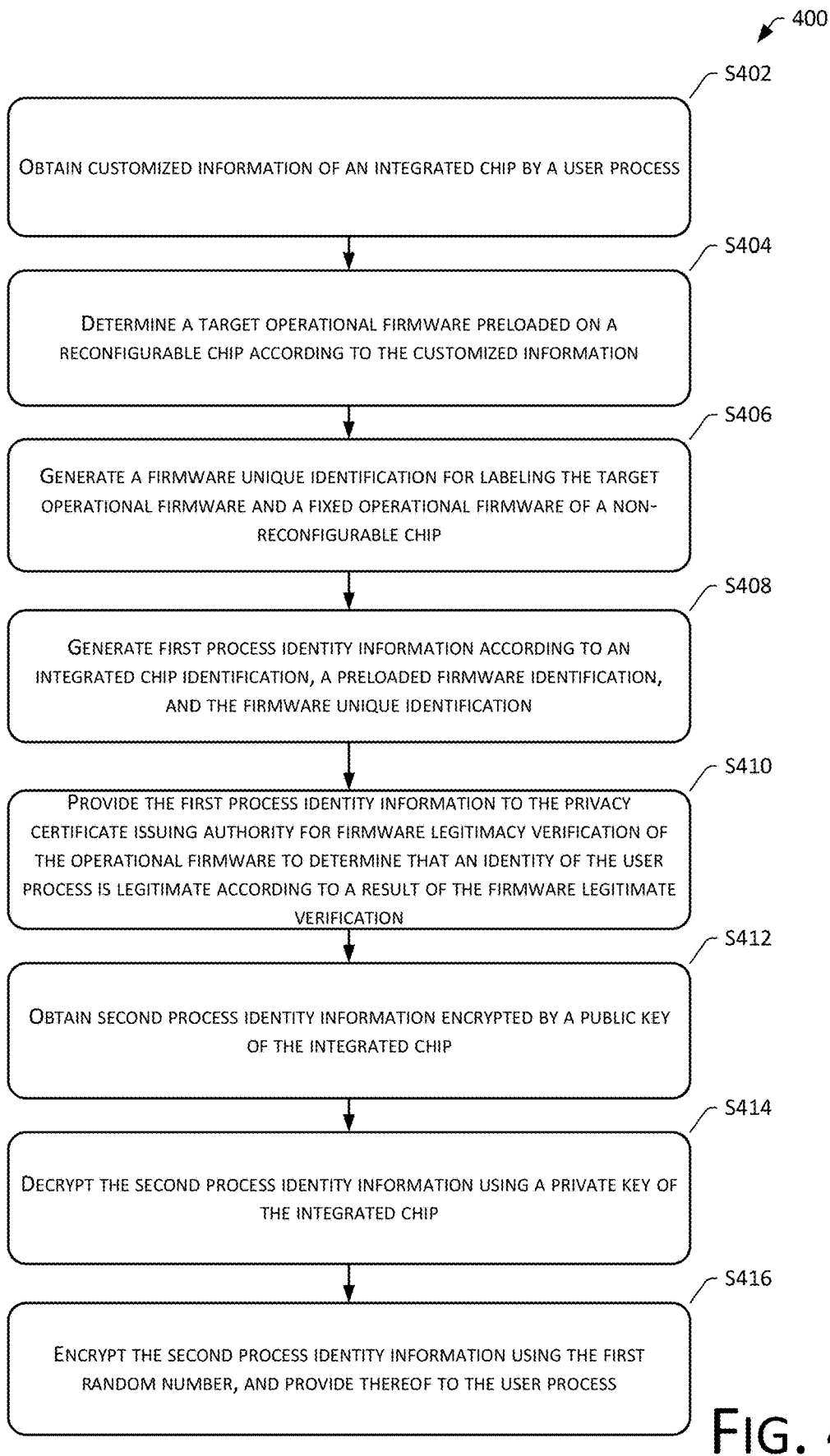
FIG. 4 illustrates a flowchart of an embodiment of an identity information processing method according to the second embodiment of the present application.

Referring to FIG. 4, a flowchart of an embodiment of an identity information processing method 400 according to the second embodiment of the present application is shown. The method 400 may include the following operations.

S402: Obtain customized information of an integrated chip by a user process.

In implementations, detailed implementations of this operation can be referenced to the description in the foregoing embodiment, and no further details are provided herein.

S404: Determine a target operational firmware preloaded on a reconfigurable chip according to the customized information.

In implementations, detailed implementations of this operation can be referenced to the description in the foregoing embodiment, and no further details are provided herein.

S406: Generate a firmware unique identification for labeling the target operational firmware and a fixed operational firmware of a non-reconfigurable chip.

In implementations, the firmware unique identification, i.e., the firmware unique identification for labeling the integrated chip, is generated according to the target operational firmware and the fixed operational firmware, i.e., the operational firmware on the integrated chip. For the firmware unique identification, hashing can be performed on the target operational firmware and the fixed operational firmware to obtain a hash value as the firmware unique identification, or hashing can be performed separately on the target operational firmware and the fixed operational firmware to obtain two hash values which are used together as the firmware unique identification, or any other suitable manner, which is not limited by the embodiments of the present application.

S408: Generate first process identity information according to an integrated chip identification, a preloaded firmware identification, and the firmware unique identification.

In implementations, the customized information includes a preloaded firmware identification, and the integrated chip identification is known to the integrated chip itself. The first process identity information can be obtained by packaging and encrypting the integrated chip identification, the preloaded firmware identification, and the firmware unique identification.

For example, a process identity private key AIK-1 generated by an integrated chip TH is used to encrypt a process identity public key AIK generated by the integrated chip, a preloaded firmware identification H_ID, an integrated chip identification T-H_ID, and a firmware unique identification [hash(T-H_ID-T-Firmware||H_ID-Firmware)]EK-1 encrypted by an integrated chip private key EK-1, a process identification L, and a platform identification PCA to obtain first process identity information I.

In implementations, the customized information further includes a process identification and a platform identification. An implementation of generating the first process identity information based on the integrated chip identification, the preloaded firmware identification of the target operational firmware, and the firmware unique identification may include: encrypting the firmware unique identification using a private key of the integrated chip; and encrypting the process identity public key generated by the integrated chip, the preloaded firmware identification, the chip integrated identification, and encrypted firmware unique identification, the process identification, and platform identification using a process identity private key generated by the integrated chip to obtain the first process identity information.

According to the TCG (Trusted Computing Group) specification, public and private keys of integrated chips are used in distribution of identity keys and identity certificates. A public key EK of an integrated chip TH is assumed to have been obtained before an identity key and an identity certificate are exchanged among a user process U, the integrated chip, and a privacy certificate issuing authority PCA.

The integrated chip has a private key of the integrated chip, which can be used to encrypt a firmware unique identification. A process identity private key generated by the integrated chip is then used to encrypt a process identity public key generated by the integrated chip, a preloaded firmware identification, an integrated chip identification, and an encrypted firmware unique identification, a process identification, and a platform identification. Information obtained after encryption is used as first process identity information, which is expressed as I={AIK, L, T-H_ID, H_ID, [hash(T-H_ID-T-Firmware||H_ID-Firmware)]$_{EK}^{-1}$, PCA]}$_{AIK}^{-1}$.

In implementations, the customized information further includes a first random number. Before generating the first process identity information based on the integrated chip identification, the preloaded firmware identification of the target operational firmware, and the firmware unique identification, the method may further include: generating a second random number, generating a process identity public key and a process identity private key based on the first random number, the second random number, and the process identification, wherein the process identity private key is stored in the integrated chip.

After receiving the customized information provided by the user process U, i.e., an encrypted information set, the integrated chip generates a second random number N2, and then generates an identity public and private key pair for the user process U based on the first random number N1, the second random number N2, and the process identification L, i.e., the process identity public key AIK and the process identity private key AIK$^{-1}$, wherein AIK=[N1||N2||L]$_{EK}^{-1}$, indicating that the private key EK$^{-1}$ of the integrated chip encrypts the first random number N1, the second random number N2, and the process identification L to obtain AIK, and AIK$^{-1}$ is maintained in the integrated chip.

The process identity private key AIK$^{-1}$ may be generated based on the first random number N1, the second random number N2, and a specific algorithm, or may be generated according to any other applicable random number, which is not limited in the embodiments of the present application.

In implementations, encrypting the customized information using the public key of the integrated chip may further include: decrypting the customized information using the private key of the integrated chip. An implementation of generating the process identity public key based on the first random number, the second random number, and the process identification may include: using the private key of the integrated chip to encrypt the first random number, the second random number, and the process identification to generate the identity public key, which is provided to the privacy certificate issuing authority via the user process.

In implementations, the integrated chip identity information is encrypted using the first random number, and the process identification and the integrated chip identity information that is obtained by decrypting using the first random number are encrypted by the user process using a public key of the privacy certificate issuing authority, and are provided to the privacy certificate issuing authority.

After the integrated chip obtains the integrated chip identity information (for example, an endorsement certificate Cert_EK=[T-H_ID, EK, MF]$_{SK(MF)}$) of the trusted high-speed data encryption card THSDEC (i.e., the integrated chip)), an encryption thereof is performed using the first random number N1 to obtain [Cert_EK]$_{N1}$, which is returned to the user process.

In implementations, when the user process obtains the first random number after decrypting the process identity public key using the public key of the integrated chip, and when the first integrated chip identification obtained after decrypting the first process identity information using the process identity public key is consistent with the second integrated chip identification obtained by decrypting the integrated chip identity information, the first process identity information, the process identity public key, the process identification, the platform identification, and the integrated chip identity information are provided by the user process to the privacy certificate issuing agency.

The integrated chip sends the integrated chip identity information encrypted by the first random number, the process identity public key, and the first process identity information to the user process. After receiving such information, the user process decrypts the encrypted integrated chip identity information [Cert_EK]N1 using the first random number N1 to obtain the integrated chip identity information Cert_EK, obtains the public key EK of the integrated chip according to Cert_EK, and verifies the legitimacy of Cert_EK.

The process identity public key AIK is decrypted using the public key EK of the integrated chip. If the decrypted information includes the first random number N1, and the first integrated chip identification T-H_ID included in the first process identity information I decrypted using the process identity public key AIK is the same as the second integrated chip identification T-H_ID in the Cert_EK in the decrypted integrated chip identity information, and the AIK and I are considered to be the process identity public key and the first process identity information sent by an legitimate integrated chip to the user process, and the process continues. The user process may provide the first process identity information, the process identity public key, the process identification, the platform identification, and the integrated chip identity information to the privacy certificate issuing authority. Otherwise, the process is terminated.

S410: Provide the first process identity information to the privacy certificate issuing authority for firmware legitimacy verification of the operational firmware to determine that an identity of the user process is legitimate according to a result of the firmware legitimate verification.

In implementations, detailed implementations of this operation can be referenced to the description in the foregoing embodiment, and no further details are provided herein.

S412: Obtain second process identity information encrypted by a public key of the integrated chip.

In implementations, after determining that the operational firmware of the integrated chip is legitimate according to the first process identity information, i.e., the identity of the user process is legitimate, the privacy certificate issuing authority may generate second process identity information for the user process, and after encrypting the second process identity information using the public key of the integrated chip, provide thereof to the user process. The user process cannot decrypt it by itself, needs to send the second process identity information encrypted by the public key of the integrated chip to the integrated chip. The integrated chip has the private key of the integrated chip, which can perform and complete a decryption thereof.

S414: Decrypt the second process identity information using a private key of the integrated chip.

In implementations, the integrated chip decrypts the encrypted second process identity information [Cert_AIK]$_{EK}$ by using the private key $EK^{-1}$ of the integrated chip to obtain the second process identity information Cert_AIK.

S416: Encrypt the second process identity information using the first random number, and provide thereof to the user process.

In implementations, the customized information includes a first random number, and the integrated chip provides the decrypted second process identity information to the user process for security. The integrated chip may encrypt the second process identity information using the random number N1 that is sent from the user process to obtain [Cer-t_AIK]$_{N1}$, and send the encrypted second process identity information to user process U.

In implementations, the encrypted second process identity information is forwarded to the integrated chip by the user process, and the user process decrypts the second process identity information using the first random number.

After the integrated chip returns the second process identity information encrypted using the first random number to the user process, the user process can decrypt thereof using the first random number to obtain the second process identity information, thus completing the entire process of distributing identity information.

According to the embodiments of the present application, by obtaining information of an integrated chip customized by a user process, and a target operational firmware preloaded on a reconfigurable chip is determined according to the customized information. A firmware unique identification used for labeling the target operational firmware and a fixed operational firmware is then generated. First process identity information is subsequently generated based on an integrated chip identification, a preloaded firmware identification and the firmware unique identification. The first process identity information is then provided to a privacy certificate issuing authority for performing a firmware legitimacy verification of an operational firmware to determine that an identity of the user process is legitimate according to a result of the firmware legitimacy verification. As such, the first process identity information generated for the user process by the integrated chip can prove the legitimacy of the fixed operational firmware of the non-reconfigurable part of the firmware, and also prove the legitimacy of the target operational firmware of the reconfigurable part. In case when the operational firmware of the integrated chip is dynamically changed, the problem that the legitimacy of the entire integrated chip cannot be verified is solved.

Furthermore, by obtaining second process identity information encrypted by a public key of the integrated chip, the second process identity information is decrypted using a private key of the integrated chip. The second process identity information is encrypted using a first random number, and provided to the user process. After the privacy certificate issuing authority verifies the legitimacy of the operational firmware of the integrated chip, the integrated chip decrypts the second process identity information provided by the privacy certificate issuing authority, to allow the user process to prove the legitimacy of the entire integrated chip by using the second process identity information.

Figure 5:
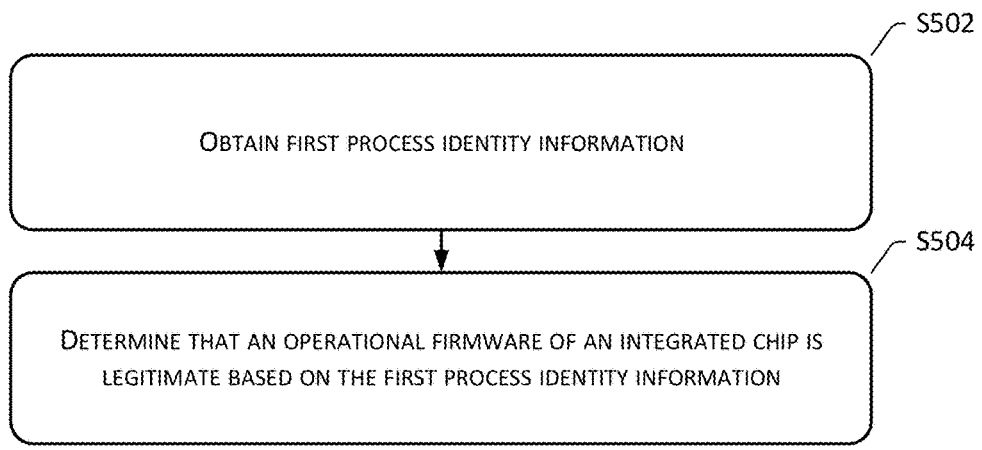
FIG. 5 illustrates a flowchart of an embodiment of an identity information processing method according to the third embodiment of the present application.

Referring to FIG. 5, a flowchart of an embodiment of an identity information processing method 500 according to the third embodiment of the present application is shown. The method 500 may include the following operations.

S502: Obtain first process identity information.

In implementations, a privacy certificate issuing authority obtains the first process identity information. Specifically, the first process identity information may be provided by an integrated chip to the privacy certificate issuing authority. Alternatively, the integrated chip sends the first process identity information to a user process, and the user process then sends the first process identity information to the privacy certificate issuing authority, or any other applicable manner. The embodiments of the present application do not have any limitations thereon.

S504: Determine that an operational firmware of an integrated chip is legitimate based on the first process identity information.

In implementations, the privacy certificate issuing authority stores information about operational firmware on legitimate integrated chips. By comparing information included in the first process identity information therewith, whether an operational firmware on the integrated chip called by the user process is legitimate can be determined. If being legitimate, an identity of the user process is legitimate.

According to the embodiments of the present application, by obtaining first process identity information, an operational firmware of an integrated chip is determined to be legitimate based on the first process identity information, so that the first process identity information generated for a user process by the integrated chip can prove the legitimacy of a fixed operational firmware of a non-reconfigurable part, and can also prove the legitimacy of a target operational firmware of a reconfigurable part. In case when the operational firmware of the integrated chip is dynamically changed, the problem that the legitimacy of the entire integrated chip cannot be verified is solved.

In implementations, after determining that the operational firmware of the integrated chip is legitimate based on the first process identity information, the method may further include: generating second process identity information used for verifying the user process based on the target operational firmware the and the fixed operational firmware, and providing the second process identity information to the user process for proving the identity of the user process to be legitimate.

To prove the legitimacy of the entire integrated chip, it is necessary to generate the first process identity information according to the target operational firmware and the fixed operational firmware. In existing distribution methods of static platform identity keys and certificates, the generation of identity information is unrelated to the reconfigurable part of the dynamic loading, thus resulting in the problem of being able to prove the legitimacy of the non-reconfigurable part only.

A plurality of different ways of generating the first process identity information may exist. For example, first process identity information is generated based on an integrated chip identification, a preloaded firmware identification, and a firmware unique identification. Alternatively, the first process identity information is generated based on a process identity public key generated according to the integrated chip, and the preloaded firmware identification, the integrated chip identification, an encrypted firmware unique identification, a process identification, and a platform identification, or any other applicable generation manner. The embodiments of the present application do not have any limitations thereon.

In implementations, the first process identity information further includes a process identification and a platform identification, wherein the second process identity information includes a platform identity certificate, and an implementation of generating the second process identity information used for verifying the user process based on the target operational firmware and the fixed operational firmware includes: encrypting a process identity public key generated by the integrated chip, a preloaded firmware identification of the target operational firmware, an integrated chip identification, and a firmware unique identification used for labeling the target operational firmware and the fixed operational firmware, the process identification, and the platform identification using a private key of a privacy certificate issuing authority to obtain the platform identity certificate.

Different from the first process identity information, the platform identity certificate is not encrypted using the process identity private key that is generated by the integrated chip. Rather, encryption is performed using the private key of the privacy certificate issuing authority to generate Cert_AIK[L, AIK, T-H_ID, H_ID, hash (T-H_ID-T-Firmware||H-Firmware), PCA]$_{SK(PCA)}$, i.e., the platform identity certificate.

In implementations, the first process identity information includes a preloaded firmware identification and an integrated chip identification, and an implementation of determining that an operational firmware of an integrated chip is legitimate based on the first process identity information may include determining that the target operational firmware and the fixed operational firmware are legitimate based on the preloaded firmware identification and the integrated chip identification.

The privacy certificate issuing authority may determine relevant information of legitimate target operational firmware and fixed operational firmware that is stored on the privacy certificate issuing authority based on the pre-loaded firmware identification and the integrated chip identification in the first process identity information, and compare relevant information in the first process identity information therewith to determine whether the operational firmware of the integrated chip is legitimate.

In implementations, before determining that the target operational firmware and the fixed operational firmware are legitimate based on the preloaded firmware identification and the integrated chip identification, the method may further include: obtaining a process identity public key, decrypting the first process identity information using the process identity public key to obtain the preloaded firmware identification, the integrated chip identification, and a firmware unique identification used for labeling the target operational firmware and the fixed operational firmware.

The first process identity information is encrypted using a process identity private key. Upon receipt, the privacy certificate issuing authority may use a process identity public key to decrypt the first process identity information, and the decrypted information includes a preloaded firmware identification, an integrated chip identification, and a firmware unique identification.

In implementations, an implementation of determining that the target operational firmware and the fixed operational firmware are legitimate based on the preloading firmware identification and the integrated chip identification may include: searching for a firmware unique identification in the privacy certificate issuing based on authority based on the preloaded firmware identification and the integrated chip identification; comparing the firmware unique identification obtained from decryption and the found firmware unique identification to verify the legitimacy of the target operational firmware and the fixed operational firmware.

For example, the first process identity information I is decrypted using the process identity public key AIK to obtain the hash (T-H_ID-T-Firmware||H_ID-Firmware)$_{EK}^{-1}$, and is decrypted using the public key EK of the integrated chip to obtain the hash (T-H_ID-T-Firmware-||H_ID-Firmware). Based on an integrated chip identification, preloaded firmware identification and firmware mapping relationship database stored on the privacy certificate issuing authority, a query about a firmware unique identification, the hash (T-H_ID-T-Firmware||H_ID-Firmware), to which the preloaded firmware identification and integrated chip identification mapped, is made in the database. A comparison of whether the two hash values are equal is performed. If they are equal, the target operational firmware and the fixed operational firmware of the firmware are legitimate.

In implementations, the method further includes: obtaining integrated chip identity information, and verifying the legitimacy of the integrated chip identity information using a chip production private key.

For example, using a chip production private key SK (MF), i.e., a private key of a manufacturer, the legitimacy of the integrated chip identity information (i.e., a certificate of the integrated chip, Cert_EK) can be verified. Since the integrated chip identity information (i.e., the certificate of the integrated chip, Cert_EK) is encrypted using a chip production private key, the integrated chip identity information is legitimate if decryption is successful.

In implementations, the integrated chip identity information and the process identification are encrypted by the user process using a public key of the privacy certificate issuing authority, and then provided to the privacy certificate issuing authority. An implementation of obtaining the integrated chip identity information may include: performing decryption with a private key of the privacy certificate issuing authority to obtain the integrated chip identity information and the first process identification. The method may further include: decrypting the process identity public key using the public key of the integrated chip to obtain a second process identification; and comparing between the first process identification and the second process identification, and determining that the process identity public key and the integrated chip identity information are generated by the same user process.

The user process encrypts the integrated chip identity information and the process identification (for the sake of differentiation, denoted as the first process identification) together using the public key PK (PCA) of the privacy certificate issuing authority, and then provides thereof to the privacy certificate issuing authority. The privacy certificate issuing authority needs to perform decryption using the private key SK (PCA) of the privacy certificate issuing authority to obtain the integrated chip identity information and the first process identification, and decrypt the process identity public key AIK using the public key EK of the integrated chip to obtain the second process identification. If the first process identification and the second process identification are consistent, the process identity public key and the integrated chip identity information are determined to be generated for the same user process.

In implementations, the first process identity information includes a process identification, and the method may further include: decrypting the first process identity information using the process identity public key to obtain a preloaded firmware identification, an integrated chip identification, and a third process identification; and comparing the first process identification with the third process identification, comparing the integrated chip identity information with the preloaded firmware identification and the integrated chip identification obtained by decrypting the first process identity information, and determining that the process identity public key and the process identity private key are generated by a legitimate integrated chip for the process identification.

The privacy certificate issuing authority uses the process identity public key AIK to decrypt the first process identity information I to obtain the preloaded firmware identification, the integrated chip identification and the third process identification, compares the first process identification with the third process identification, and compares the integrated chip identity information with the preloaded firmware identification and the integrated chip identification obtained by decrypting the first process identity information. If the first process identification and the third process identification are the same, and the preloaded firmware identification is consistent with the integrated chip identification, a determination is made that the process identity public key and process identity private key are generated by a legitimate integrated chip for the process identification.

It is worth noting that the chip production private key is used to verify that the integrated chip identity information is legitimate; the process identity public key and the integrated chip identity information are determined to be generated by the same user process; the process identity public key and the process identity private key are determined to be generated by a legitimate integrated chip for the process identification; and the target operational firmware and the fixed operational firmware are verified to be legitimate. If all of the above are satisfied, the process continues. Otherwise the process is terminated. Therefore, the second process identity information is provided to the user process only when the identity of the user process is verified to be authenticated.

Figure 6:
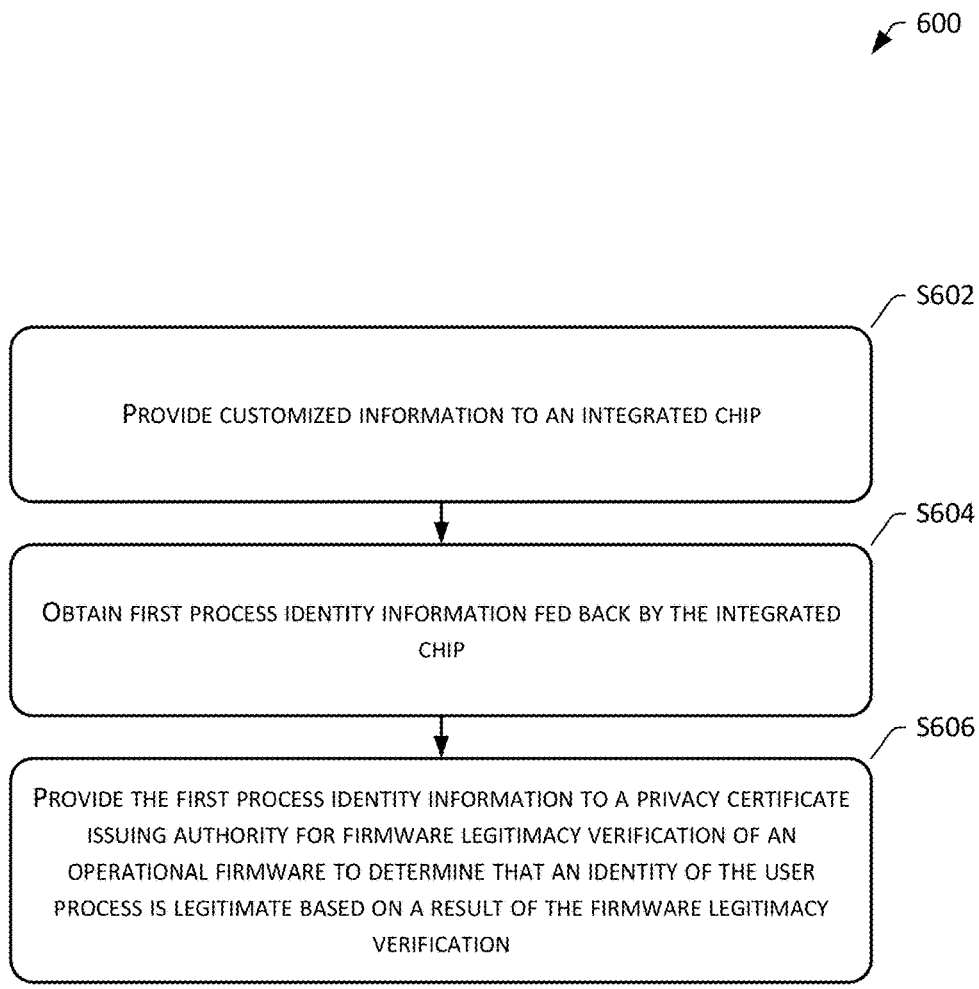
FIG. 6 illustrates a flowchart of an embodiment of an identity information processing method according to the fourth embodiment of the present application.

Referring to FIG. 6, a flowchart of an embodiment of an identity information processing method 600 according to the fourth embodiment of the present application is shown. The method 600 may include the following operations.

S602: Provide customized information to an integrated chip.

In implementations, a user process provides customized information to an integrated chip.

S604: Obtain first process identity information fed back by the integrated chip.

In implementations, the integrated chip generates first process identity information for the user process in response to a request of the user process, and returns the process identity information to the user process.

S606: Provide the first process identity information to a privacy certificate issuing authority for firmware legitimacy verification of an operational firmware to determine that an identity of the user process is legitimate based on a result of the firmware legitimacy verification.

According to the embodiments of the present application, by obtaining first process identity information returned by an integrated chip, the first process identity information is provided to a privacy certificate issuing authority for performing a firmware legitimacy verification of an operational firmware, so as to determine the legitimacy of a user process according to a result of the firmware legitimacy verification. Thereby, the first process identity information generated for the user process by the integrated chip can prove the legitimacy of a fixed operational firmware of a non-reconfigurable part, and can also prove the legitimacy of a target operational firmware of a reconfigurable part. In a situation that the operational firmware of the integrated chip is dynamically changed, the problem that the legitimacy of the entire integrated chip cannot be verified is solved.

In implementations, the customized information carries a first random number, and the method may further include: obtaining integrated chip identity information provided by the integrated chip, the integrated chip identity information being encrypted using the first random number; decrypting the integrated chip identity information using the first random number; and encrypting the integrated chip identity information using a public key of the privacy certificate issuing authority, and providing the encrypted integrated chip identity information to the privacy certificate issuing authority.

In implementations, the method further includes: decrypting a process identity public key using a public key of the integrated chip to obtain the first random number; using the process identity public key to decrypt the first process identity information to obtain first integrated chip identification; decrypting the integrated chip identity information to obtain second integrated chip identification; and providing the first process identity information, the process identity public key, a process identification, a platform identification, and the integrated chip identity information to the privacy certificate issuing authority if the first integrated chip identification is the same as the second integrated chip identification.

In implementations, detailed implementations can be referenced to the description in the foregoing embodiment, and no further details are provided herein.

Figure 7:
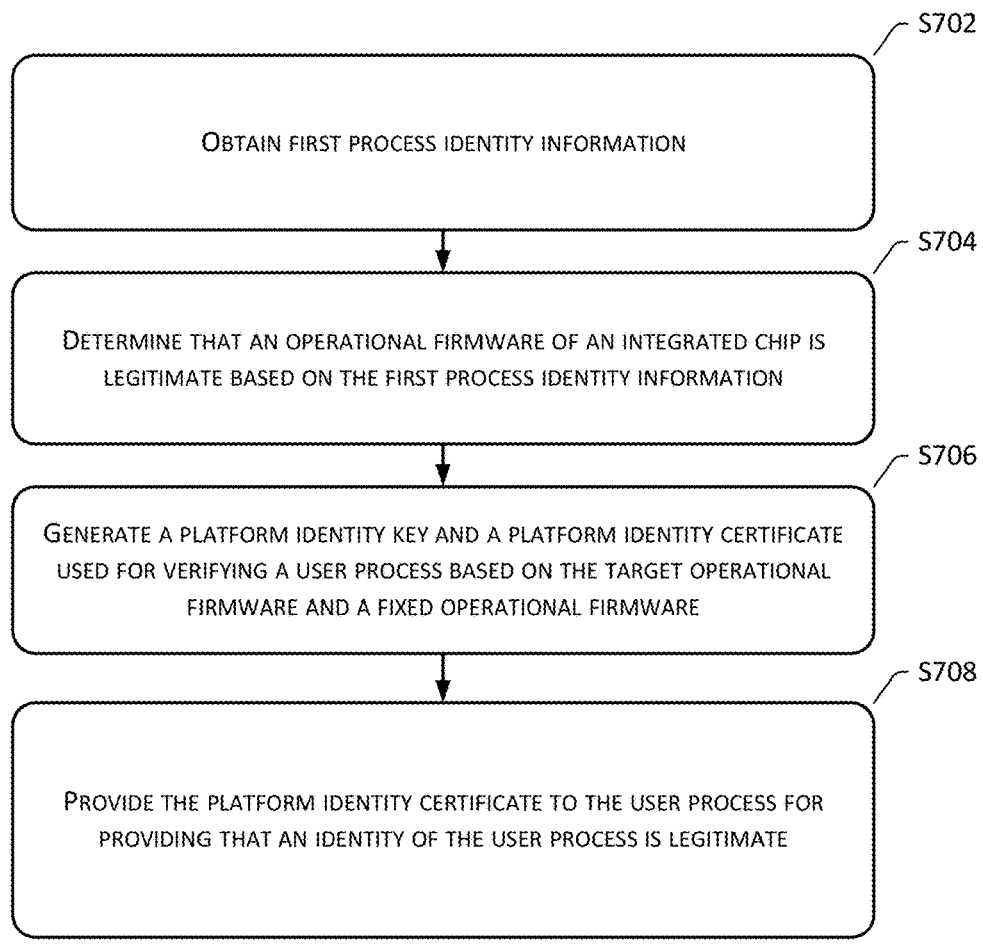
FIG. 7 illustrates a flowchart of an embodiment of a method for distributing an identity key and a certificate according to the fifth embodiment of the present application.

Referring to FIG. 7, a flowchart of an embodiment of a method 700 for distributing a platform identity key and a certificate according to the fifth embodiment of the present application is shown. The method 700 may include the following operations.

S702: Obtain first process identity information.

The first process identity information is used to verify a user process, and the first process identity information includes a process identity key. The first process identity information is generated based on a target operational firmware preloaded on a reconfigurable chip and a fixed operational firmware of a non-reconfigurable chip. The non-reconfigurable chip and the reconfigurable chip constitute an integrated chip.

It is worth noting that the process identity key includes a process identity public key and a process identity private key. The process identity private key is stored in the integrated chip. Therefore, the process identity public key is obtained therefrom.

S704: Determine that an operational firmware of an integrated chip is legitimate based on the first process identity information.

S706: Generate a platform identity key and a platform identity certificate used for verifying a user process based on the target operational firmware and a fixed operational firmware.

In implementations, the platform identity certificate is generated based on the target operational firmware and the fixed operational firmware. For example, a private key of a privacy certificate issuing authority is used to encrypt the process identity public key generated by the integrated chip, and a preloaded firmware identification of the target operational firmware, an integrated chip identification, a firmware unique identification used for labeling the target operational firmware and the fixed operational firmware, a process identification, and a platform identification to obtain a platform identity certificate.

S708: Provide the platform identity certificate to the user process for providing that an identity of the user process is legitimate.

According to the embodiments of the present application, by obtaining first process identity information, an operational firmware of an integrated chip is determined to be legitimate based on the first process identity information. A platform identity certificate used for verifying a user process is generated based on a target operational firmware and a fixed operational firmware. The platform identity certificate is provided to the user process for proving that an identity of the user process is legitimate. As such, the first process identity information generated for the user process by the integrated chip can prove the legitimacy of the fixed operational firmware of the non-reconfigurable part, and can also prove the legitimacy of the target operational firmware of the reconfigurable part. In a situation that the operational firmware of the integrated chip is dynamically changed, the problem that the legitimacy of the entire integrated chip cannot be verified is solved. Furthermore, after verifying that the identity of the user process is legitimate, the privacy certificate issuing authority issues the platform identity certificate to the user process to allow the user process to prove the legitimacy of the entire integrated chip using the platform identity certificate.

Figure 8:
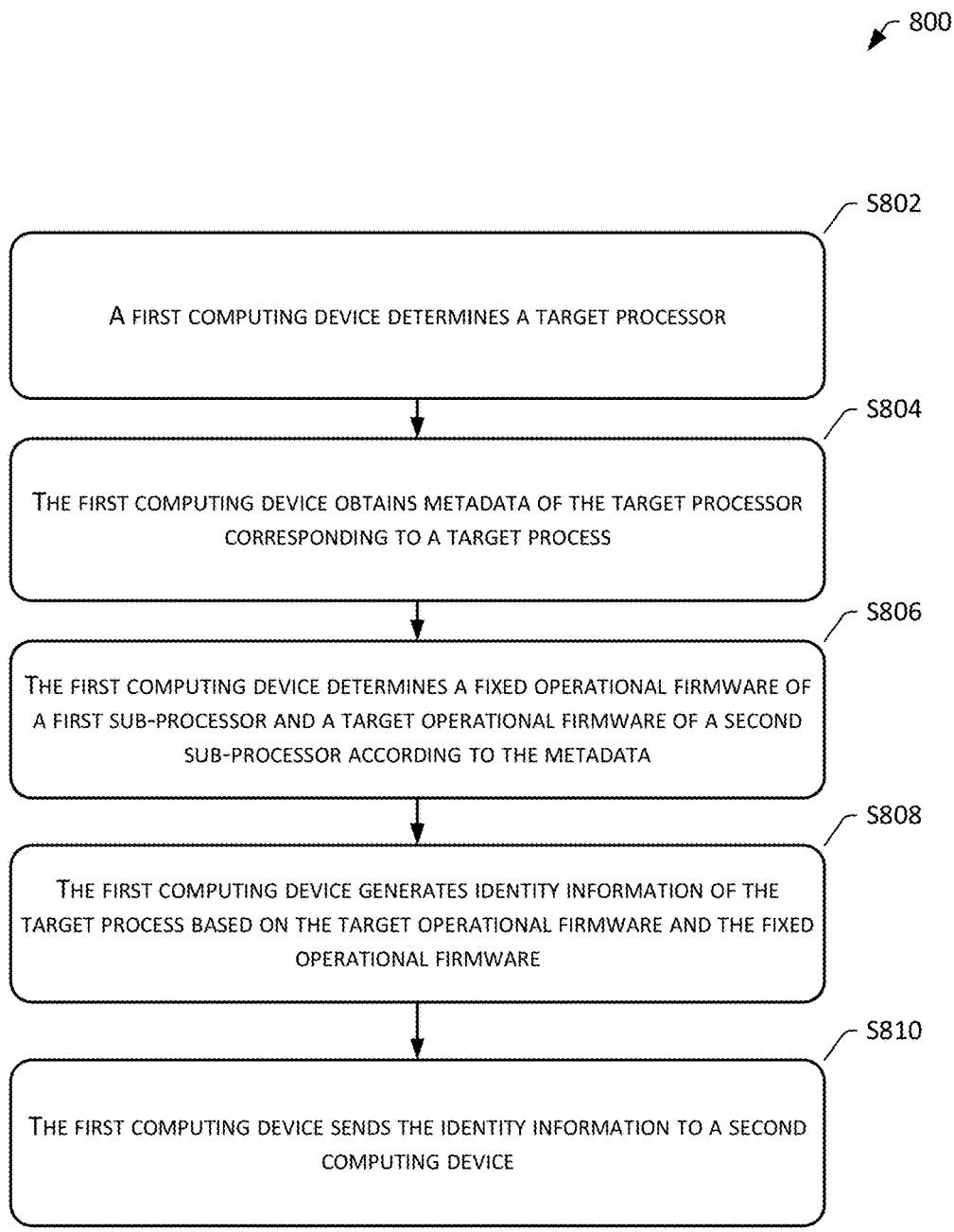
FIG. 8 illustrates a flowchart of an embodiment of a data processing method according to the sixth embodiment of the present application.

Referring to FIG. 8, a flowchart of an embodiment of a data processing method 800 according to the sixth embodiment of the present application is shown. The method 800 may include the following operations.

S802: A first computing device determines a target processor.

In implementations, a first computing device and a second computing device correspond to each other. The first computing device is a computing device where a target process is located. The first computing device can use a target processor, and can also send identity information of the target process to the second computing device. The second computing device may perform first verification on a fixed operational firmware or a target operational firmware based on identity information, and determines whether the identity information meets a preset condition based on a result of the first verification. A target process includes a user process, or any other applicable process, which is not limited in the embodiments of the present application.

The first computing device needs to utilize a target processor when generating identity information for a target process. The target processor includes a first sub-processor and a second sub-processor. The target processor includes an integrated chip. The first sub-processor includes a non-reconfigurable chip, and the second sub-processor includes a reconfigurable chip, which may specifically include any applicable target processor, first sub-processor, and second sub-processor, which are not limited in the embodiments of the present application.

S804: The first computing device obtains metadata of the target processor corresponding to a target process.

In implementations, the metadata is given to the target processor by the target process, and is used to determine a fixed operational firmware of the first sub-processor of the target processor, and a target operational firmware of the second sub-processor. The metadata includes customized information of an integrated chip by a user process, or any other applicable data, which is not limited by the embodiments of the present application.

S806: The first computing device determines a fixed operational firmware of a first sub-processor and a target operational firmware of a second sub-processor according to the metadata.

In implementations, the fixed operational firmware and the target operational firmware may be determined according to the metadata.

S808: The first computing device generates identity information of the target process based on the target operational firmware and the fixed operational firmware.

In implementations, the identity information is used for performing a first verification of the fixed operational firmware or the target operational firmware. Since the target process is located in the first computing device, identity information can be generated for the target process based on the target operational firmware and the fixed operational firmware in the target processor of the first computing device. The identity information includes first process identity information, or any other applicable identity information, which is not limited in the embodiments of the present application.

Details of implementations of generating the identity information of the target process based on the target operational firmware and the fixed operational firmware can be referenced to the description in the foregoing embodiments, and no further details are provided herein.

S810: The first computing device sends the identity information to a second computing device.

According to the embodiments of the present application, a first computing device determines a target processor, metadata of the target processor corresponding to a target process is obtained. Based on the metadata, a fixed operational firmware of a first sub-processor and a target operational firmware of a second sub-processor are determined. Identity information of the target process is generated based on the target operational firmware and the fixed operational firmware. The identity information is sent to a second computing device to allow the second computing device to perform a first verification based on the identity information, and to determine whether the identity information satisfies a preset condition. Thereby, the identity information generated for the target process by the first computing device can verify the fixed operational firmware, and can also verify the target operational firmware. In a situation where an operational firmware of a target processor is dynamically changed, the problem that the entire target processor cannot be verified is solved.

Figure 9:
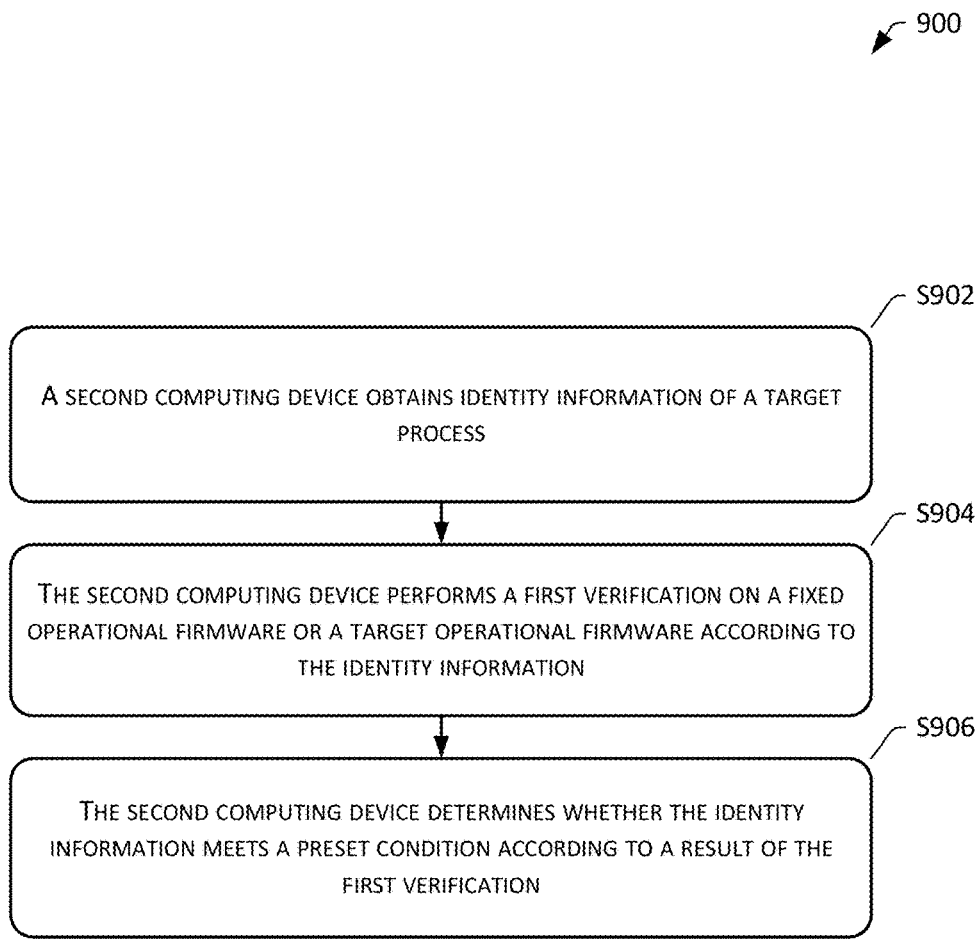
FIG. 9 illustrates a flowchart of an embodiment of a data processing method according to the seventh embodiment of the present application.

Referring to FIG. 9, a flowchart of an embodiment of a data processing method 900 according to the seventh embodiment of the present application is shown. The method may specifically include the following operations:

S902: A second computing device obtains identity information of a target process.

In implementations, a first computing device determines a target processor, obtains metadata of the target processor corresponding to a target process, determines a fixed operational firmware of a first sub-processor and a target operational firmware of a second sub-processor according to the metadata, and generates identity information based on the target operational firmware and the fixed operational firmware.

S904: The second computing device performs a first verification on a fixed operational firmware or a target operational firmware according to the identity information.

In implementations, the first verification includes verifying whether an operational firmware of an integrated chip is legitimate according to first process identity information, or any other applicable verification, which is not limited by the embodiments of the present application.

S906: The second computing device determines whether the identity information meets a preset condition according to a result of the first verification.

In implementations, the result of the first verification is a verification of determining that the operational firmware of the integrated chip is legitimate based on the first process identity information. The identity information is generated based on the fixed operational firmware and the target operational firmware. Therefore, the result of the first verification may be used to determine whether the identity information satisfies a preset condition. For example, a privacy certificate issuing authority (i.e., the second computing device) performs firmware legitimacy verification (i.e., first verification) of the operational firmware, and a result of the verification is firmware being legitimate. As such, the identity of the user process is determined to be legitimate. Otherwise it is not legitimate. The preset condition includes whether the identity is legitimate, or any other applicable condition, which is not limited by the embodiments of the present application.

According to the embodiments of the present application, a second computing device obtains identity information of a target process, and performs a first verification on a fixed operational firmware or a target operational firmware based on the identity information, and determines whether the identity information satisfies a preset condition according to a result of the first verification. As such, the identity information generated for the target process by a first computing device can verify the fixed operational firmware, and can also verify the target operational firmware. In a situation that an operational firmware of a target processor is dynamically changed, the problem of not being able to verify the entire target processor is resolved.

Figure 10:
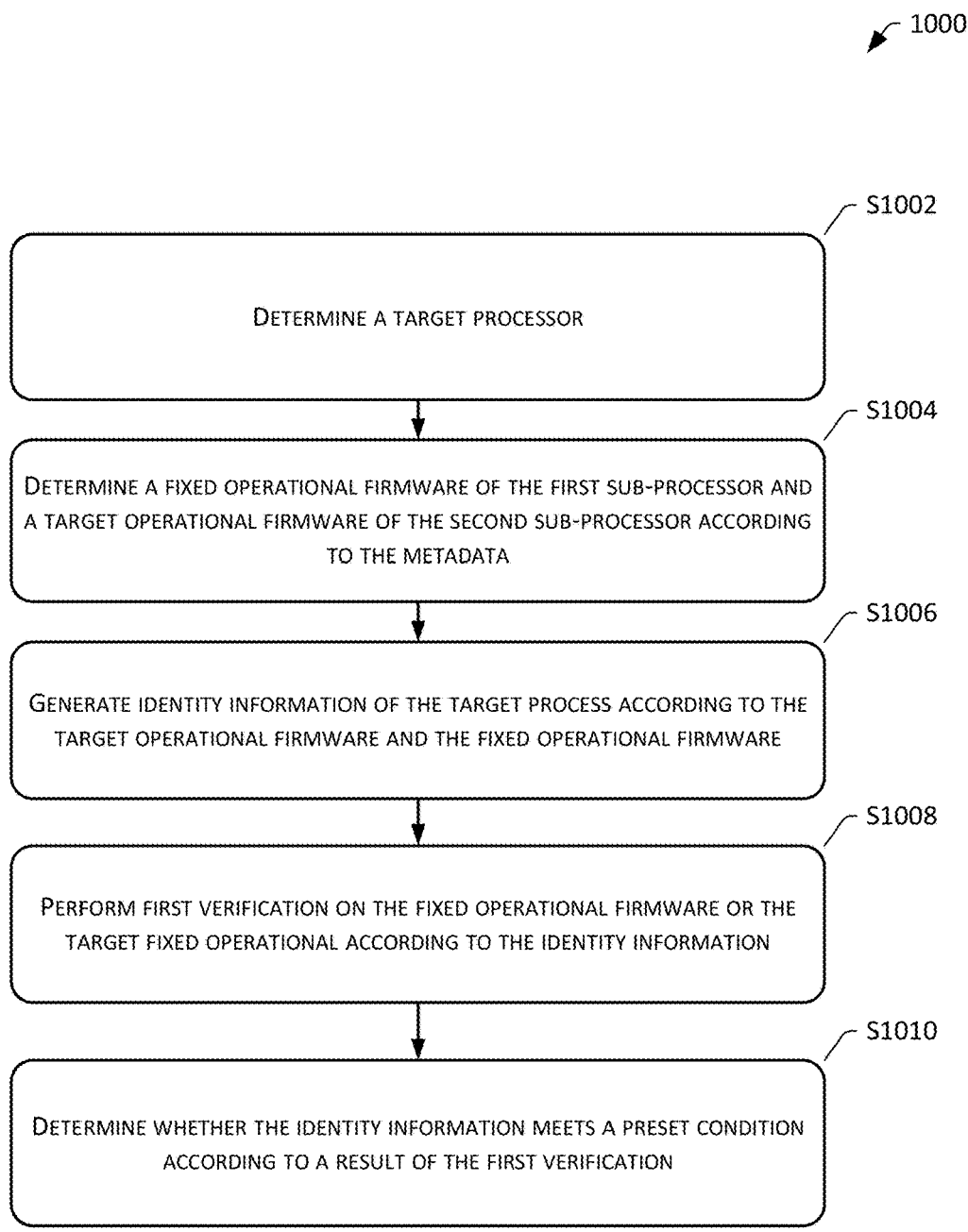
FIG. 10 illustrates a flowchart of an embodiment of a data processing method according to eighth embodiment of the present application.

Referring to FIG. 10, a flowchart of an embodiment of a data processing method 1000 according to the eighth embodiment of the present application is shown. The method may specifically include the following operations:

S1002: Determine a target processor.

The target processor includes a first sub-processor and a second sub-processor, and the target processor includes metadata corresponding to a target process.

S1004: Determine a fixed operational firmware of the first sub-processor and a target operational firmware of the second sub-processor according to the metadata.

S1006: Generate identity information of the target process according to the target operational firmware and the fixed operational firmware.

S1008: Perform first verification on the fixed operational firmware or the target fixed operational according to the identity information.

S1010: Determine whether the identity information meets a preset condition according to a result of the first verification.

In implementations, the foregoing operations may also be performed on the same device, which is not limited by the embodiments of the present application.

According to the embodiments of the present application, metadata of a target processor corresponding to a target process is obtained by determining the target processor. A fixed operational firmware of a first sub-processer and a target operational firmware of a second sub-processor are determined according to the metadata. Identity information of the target process is generated based on the target operational firmware and the fixed operational firmware, so that first verification is performed based on the identity information, and a determination is made as to whether the identity information meets a preset condition. As such, the identity information that is generated for the target process can verify the fixed operational firmware, and can also verify the target operational firmware. Under a circumstance that an operational firmware of a target processor is dynamically changed, the problem of not being able to verify the entire target processor is solved.

Figure 11:
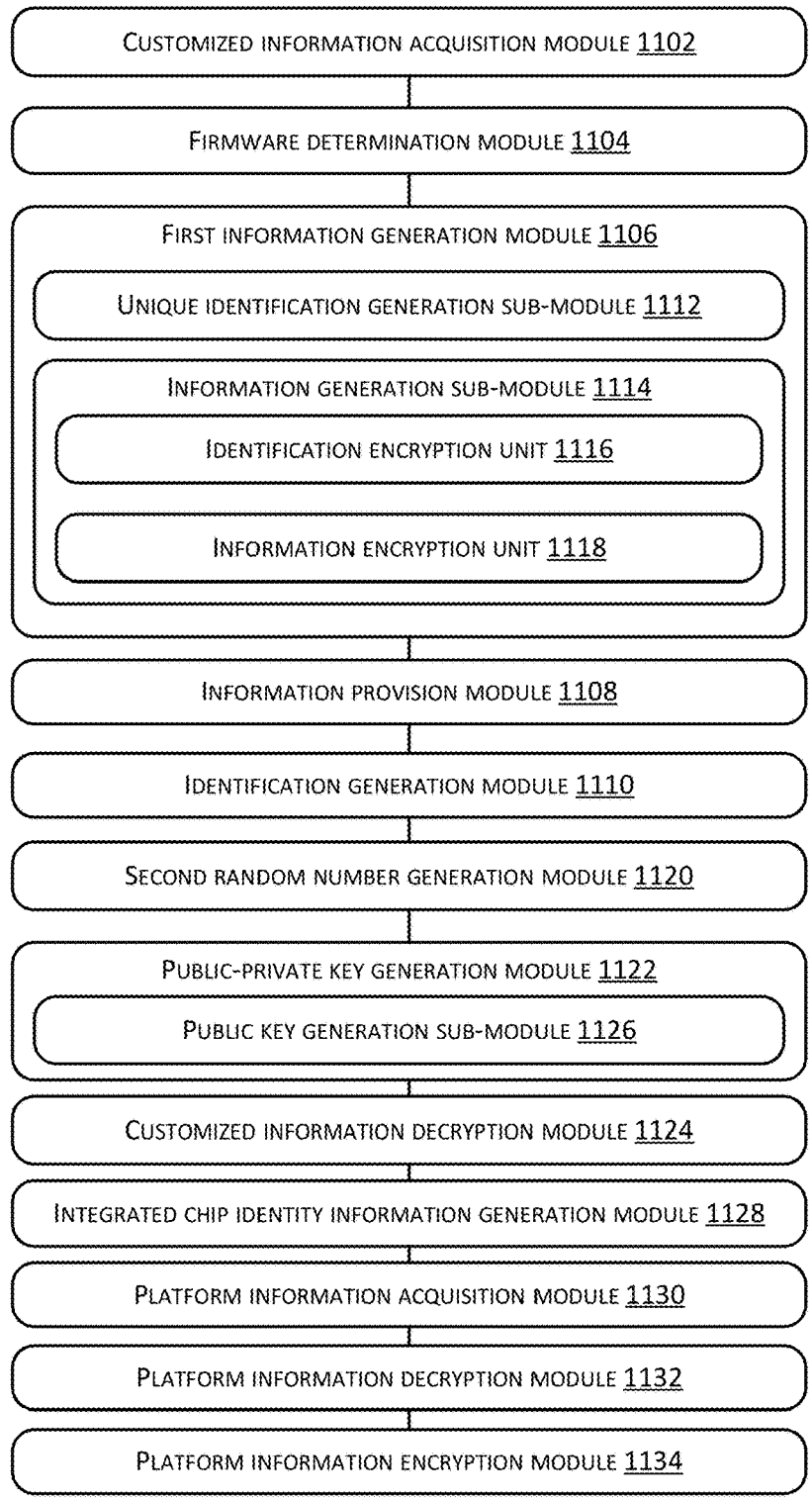
FIG. 11 illustrates a structural block diagram of an embodiment of an identity information processing apparatus according to the ninth embodiment of the present application.

FIG. 11 is a structural block diagram of an embodiment of an identity information processing apparatus 1100 according to the ninth embodiment of the present application, which may specifically include:

a customized information acquisition module 1102 configured to obtain customized information of an integrated chip by a user process, wherein the integrated chip includes a non-reconfigurable chip and a reconfigurable chip;

a firmware determination module 1104 configured to determine a target operational firmware preloaded on the reconfigurable chip based on the customized information;

a first information generation module 1106 configured to generate first process identity information used for verifying the user process according to the target operational firmware and a fixed operational firmware of the non-reconfigurable chip; and an information provision module 1108 configured to provide the first process identity information to a privacy certificate issuing authority for firmware legitimacy verification of an operational firmware to determine that an identity of the user process is legitimate according to a result of the firmware legitimacy verification.

In implementations, the operational firmware includes one or more operational algorithms, wherein the customized information includes a preloaded firmware identification, the preloaded firmware identification corresponds to at least one operational algorithm, and the apparatus 1100 further comprises:

an identification generation module 1110 configured to generate respective preloaded firmware identifications corresponding to a plurality of operational algorithms of the operational firmware according to a preloaded firmware identification corresponding to each operational algorithm.

In implementations, the customized information carries a preloaded firmware identification, and the first information generation module 1106 includes:

a unique identification generation sub-module 1112 configured to generate a firmware unique identification used for labeling the target operational firmware and the fixed operational firmware of the non-reconfigurable chip; and an information generation sub-module 1114 configured to generate the first process identity information based on an integrated chip identification, the preloaded firmware identification, and the firmware unique identification.

In implementations, the customized information further includes a process identification and a platform identification, and the information generation sub-module 1114 includes:

an identification encryption unit 1116 configured to encrypt the firmware unique identification using a private key of the integrated chip; and an information encryption unit 1118 configured to encrypt a process identity public key that is generated by the integrated chip, the preloaded firmware identification, the integrated chip identification, the encrypted firmware unique identification, the process identification, and the platform identification using a process identity private key generated by the integrated chip, to obtain the first process identity information.

In implementations, the customized information further includes a first random number, and the apparatus further 1100 includes:

a second random number generation module 1120 configured to generate a second random number before generating the first process identity information based on the integrated chip identification, the preloaded firmware identification of the target operational firmware, and the firmware unique identification; and a public-private key generation module 1122 configured to generate a process identity public key and a process identity private key based on the first random number, the second random number, and the process identification, wherein the process identity private key is stored on the integrated chip.

In implementations, the customized information is encrypted by using a public key of the integrated chip, and the apparatus 1100 further includes:

a customized information decryption module 1124 configured to decrypt the customized information using a private key of the integrated chip.

The public private key generation module 1122 includes:

a public key generation sub-module 1126 configured to encrypt the first random number, the second random number, and the process identification using the private key of the integrated chip to generate the process identity public key, and providing the process identity public key to the privacy certificate issuing authority through the user process.

In implementations, the apparatus 1100 further includes:

an integrated chip identity information generation module 1128 configured to generate integrated chip identity information based on the integrated chip identification, the public key of the integrated chip, and a chip producer identification, and providing the integrated chip identity information to the privacy certificate issuing authority through the user process.

In implementations, the integrated chip identity information is encrypted using the first random number, and the process identification and the integrated chip identity information obtained by decryption using the first random number are encrypted by the user process using a public key of the privacy certificate issuing authority, and provided to the privacy certificate issuing authority.

In implementations, when the user process obtains the first random number after using the public key of the integrated chip to decrypt the process identity public key, and a first integrated chip identification that is obtained by decrypting the first process identity information using the process identity public key is consistent with a second integrated chip identification that is obtained by decrypting the integrated chip identity information, the first process identity information, the process identity public key, the process identification, the platform identification, and the integrated chip identity information are provided by the user process to the privacy certificate issuing authority.

In implementations, the customized information includes a first random number, and the apparatus 1100 further includes:

a platform information acquisition module 1130 configured to obtain second process identity information encrypted by a public key of the integrated chip;

a platform information decryption module 1132 configured to decrypt the second process identity information using a private key of the integrated chip; and a platform information encryption module 1134 configured to encrypt the second process identity information using the first random number and providing the encrypted second process identity information to the user process.

In implementations, the encrypted second process identity information is forwarded to the integrated chip through the user process, and the user process decrypts the second process identity information using the first random number.

According to the embodiments of the present application, by obtaining information of an integrated chip customized by a user process, and a target operational firmware preloaded on a reconfigurable chip is determined according to the customized information. First process identity information used for verifying the user process is then generated based on the target operational firmware and a fixed operational firmware of a non-reconfigurable chip. The first process identity information is then provided to a privacy certificate issuing authority for performing a firmware legitimacy verification of an operational firmware to determine that an identity of the user process is legitimate according to a result of the firmware legitimacy verification. As such, the first process identity information generated for the user process by the integrated chip can prove the legitimacy of the fixed operational firmware of the non-reconfigurable part of the firmware, and also prove the legitimacy of the target operational firmware of the reconfigurable part. In case when the operational firmware of the integrated chip is dynamically changed, the problem that the legitimacy of the entire integrated chip cannot be verified is solved.

Figure 12:
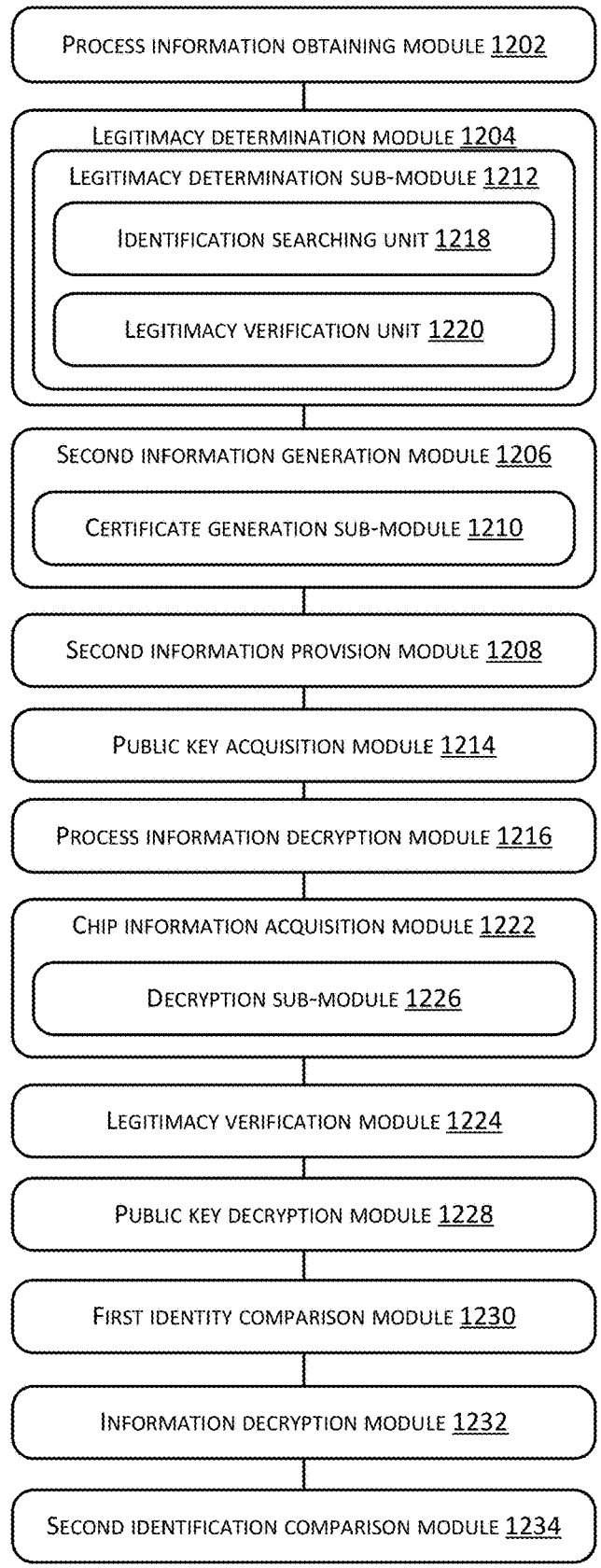
FIG. 12 illustrates a structural block diagram of an embodiment of an identity information processing apparatus according to the tenth embodiment of the present application.

Referring to FIG. 12, it is a structural block diagram of an embodiment of an identity information processing apparatus 1200 according to the tenth embodiment of the present application, which may specifically include:

a process information obtaining module 1202 configured to obtain first process identity information, wherein the first process identity information is used for verifying a user process, and the first process identity information is generated based on a target operational firmware that is pre-loaded on a reconfigurable chip and a fixed operational firmware of a non-reconfigurable chip, the non-reconfigurable chip and the reconfigurable chip form an integrated chip; and a legitimacy determination module 1204 configured to determine that the operational firmware of the integrated chip is legitimate according to the first process identity information.

In implementations, the apparatus 1200 further includes:
a second information generation module 1206 configured to: generating second process identity information used for verifying the user process based on the target operational firmware and the fixed operational firmware after determining that the operational firmware of the integrated chip is legitimate according to the first process identity information; and
a second information provision module 1208 configured to provide the second process identity information to the user process for verifying the legitimacy of an identity of the user process.

In implementations, the first process identity information further includes a process identification and a platform identification, wherein the second process identity information includes a platform identity certificate, and the second information generation module 1206 includes:
a certificate generation sub-module 1210 configured to encrypt a process identity public key generated by the integrated chip, a preloaded firmware identification of the target operational firmware, an integrated chip identification, and a firmware unique identification used for labeling the target operational firmware and the fixed operational firmware, the process identification, and the platform identification using a private key of a privacy certificate issuing authority to obtain the platform identity certificate.

In implementations, the first process identity information includes a preloaded firmware identification and an integrated chip identification, and the legitimacy determination module 1204 includes:
a legitimacy determination sub-module 1212 configured to determine that the target operational firmware and the fixed operational firmware are legitimate based on the preloaded firmware identification and the integrated chip identification.

In implementations, the apparatus 1200 further includes:
a public key acquisition module 1214 configured to obtain a process identity public key before determining that the target operational firmware and the fixed operational firmware are legitimate based on the preloaded firmware identification and the integrated chip identification; and
a process information decryption module 1216 configured to decrypt the first process identity information using the process identity public key to obtain the preloaded firmware identification, the integrated chip identification, and a firmware unique identification used for labeling the target operational firmware and the fixed operational firmware.

In implementations, the legitimacy determination sub-module 1212 includes:
an identification searching unit 1218 configured to search for a firmware unique identification on the privacy certificate issuing authority according to the preloaded firmware identification and the integrated chip identification; and
a legitimacy verification unit 1220 configured to compare a firmware unique identification obtained from decryption with the firmware unique identification that is found to verify the legitimacy of the target operational firmware and the fixed operational firmware.

In implementations, the apparatus 1200 further includes:
a chip information acquisition module 1222 configured to obtain integrated chip identity information; and
a legitimacy verification module 1224 configured to verify the legitimacy of integrated chip identity information using a chip production private key.

In implementations, the integrated chip identity information and the process identification are encrypted by the user process using a public key of the privacy certificate issuing authority, and then provided to the privacy certificate issuing authority, and the chip information acquisition module 1222 includes:
a decryption sub-module 1226 configured to perform decryption using a private key of the privacy certificate issuing authority to obtain the integrated chip identity information and a first process identification.

The apparatus 1200 also includes:
a public key decryption module 1228 configured to decrypt the process identity public key using a public key of the integrated chip to obtain a second process identification; and
a first identity comparison module 1230 configured to compare the first process identification with the second process identification, determining that the process identity public key and integrated chip identity information are generated for a same user process.

In implementations, the first process identity information includes a process identification, and the apparatus 1200 further includes:
an information decryption module 1232 configured to decrypt the first process identity information using the process identity public key to obtain the preloaded firmware identification, the integrated chip identification, and a third process identification; and
a second identification comparison module 1234 configured to compare the first process identification with the third process identification, and comparing the integrated chip identity information with the pre-loaded firmware identification and the integrated chip identification obtained by decrypting the first process identity information, to determine that the process identity public key and the process identity private key are generated for the process identification by an legitimate integrated chip.

According to the embodiments of the present application, by obtaining first process identity information, an operational firmware of an integrated chip is determined to be legitimate based on the first process identity information, so that the first process identity information generated for a user process by the integrated chip can prove the legitimacy of a fixed operational firmware of a non-reconfigurable part, and can also prove the legitimacy of a target operational firmware of a reconfigurable part. In case when the operational firmware of the integrated chip is dynamically changed, the problem that the legitimacy of the entire integrated chip cannot be verified is solved.

Figure 13:
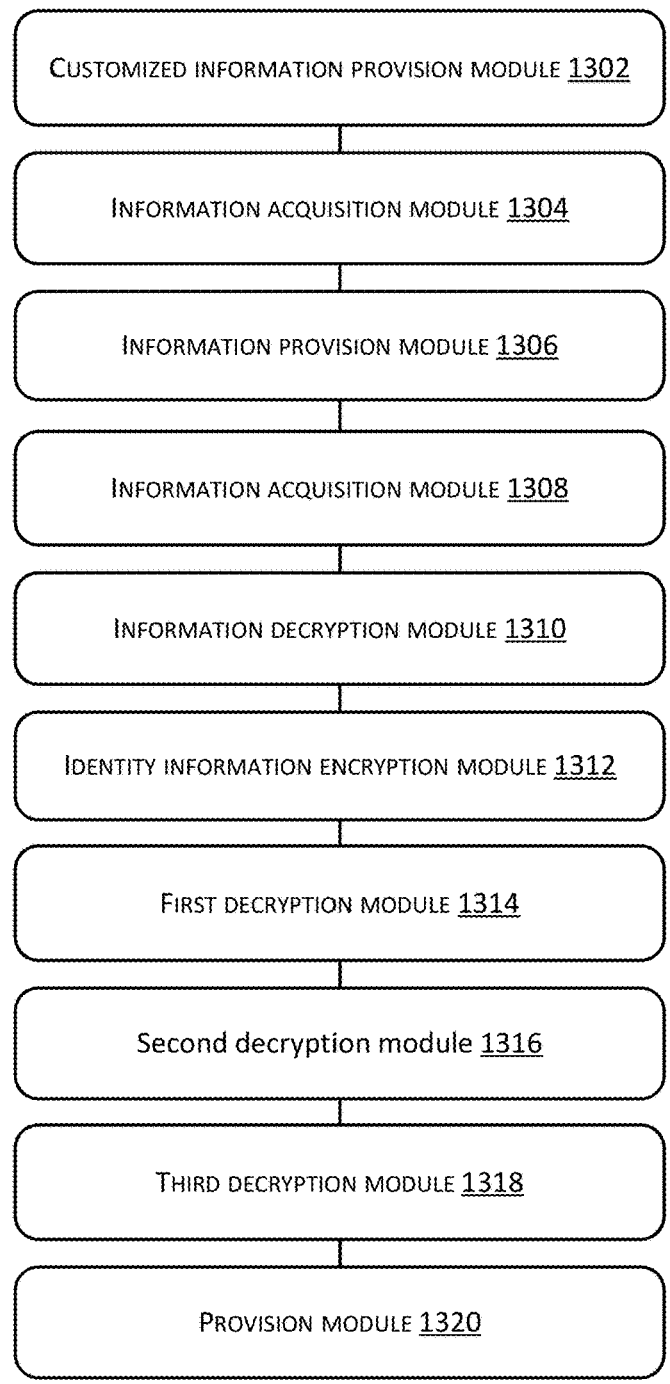
FIG. 13 illustrates a structural block diagram of an embodiment of an identity information processing apparatus according to the eleventh embodiment of the present application.

Referring to FIG. 13, a structural block diagram of an embodiment of an identity information processing apparatus 1300 according to the eleventh embodiment of the present application is shown, which may specifically include:

a customized information provision module 1302 configured to provide customized information to an integrated chip, to allow determination of a target operational firmware preloaded on a reconfigurable chip according to the customized information, and generation of first process identity information used for verifying a user process based on the target operational firmware and a fixed operational firmware of a non-reconfigurable chip, wherein the integrated chip includes the non-reconfigurable chip and the reconfigurable chip;

an information acquisition module 1304 configured to obtain the first process identity information returned by the integrated chip; and an information provision module 1306 configured to provide the first process identity information to a privacy certificate issuing authority for performing a firmware legitimacy verification of the operational firmware to determine that an identity of the user process is legitimate according to a result of the firmware legitimacy verification.

In implementations, the customized information includes a first random number, and the apparatus 1300 further includes:

an information acquisition module 1308 configured to obtain integrated chip identity information provided by the integrated chip, the integrated chip identity information being encrypted by the first random number;

an information decryption module 1310 configured to decrypt the integrated chip identity information using the first random number; and an identity information encryption module 1312 configured to encrypt the integrated chip identity information using a public key of the privacy certificate issuing authority and providing the encrypted integrated chip identity information to the privacy certificate issuing authority.

In implementations, the apparatus 1300 further includes:

a first decryption module 1314 configured to decrypt a process identity public key using a public key of the integrated chip to obtain the first random number;

a second decryption module 1316 configured to decrypt the first process identity information using the process identity public key to obtain a first integrated chip identification;

a third decryption module 1318 configured to decrypt the integrated chip identity information to obtain a second integrated chip identification; and a provision module 1320 configured to provide the first process identity information, the process identity public key, a process identification, a platform identification, and the integrated chip identity information to the privacy certificate issuing authority if the first integrated chip identification is consistent with the second integrated chip identification.

According to the embodiments of the present application, by obtaining first process identity information returned by an integrated chip, the first process identity information is provided to a privacy certificate issuing authority for performing a firmware legitimacy verification of an operational firmware, so as to determine the legitimacy of a user process according to a result of the firmware legitimacy verification. Thereby, the first process identity information generated for the user process by the integrated chip can prove the legitimacy of a fixed operational firmware of a non-reconfigurable part, and can also prove the legitimacy of a target operational firmware of a reconfigurable part. In a situation that the operational firmware of the integrated chip is dynamically changed, the problem that the legitimacy of the entire integrated chip cannot be verified is solved.

Figure 14:
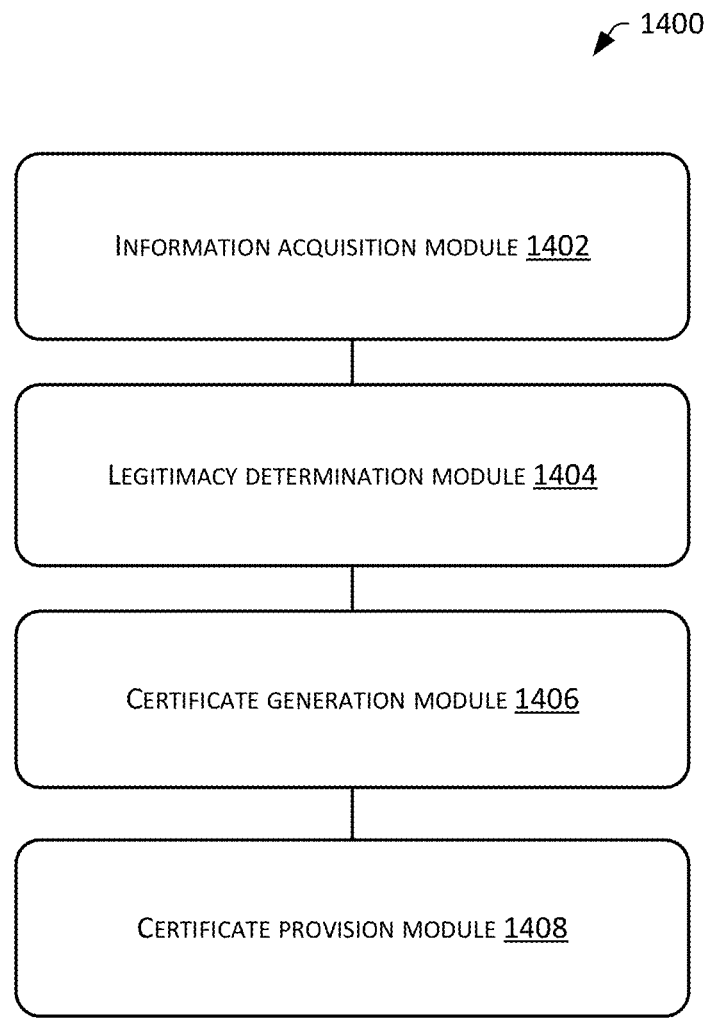
FIG. 14 illustrates a structural block diagram of an apparatus for distributing an identity key and a certificate according to the twelfth embodiment of the present application.

Referring to FIG. 14, a structural block diagram of an apparatus 1400 for distributing an identity key and a certificate according to the twelfth embodiment of the present application is shown, which may specifically include:

an information acquisition module 1402 configured to obtain first process identity information, wherein the first process identity information is used for verifying a user process, the first process identity information includes a process identity key, and the first process identity information is generated based on a target operational firmware that is preloaded on a reconfigurable chip and a fixed operational firmware of a non-reconfigurable chip, and the non-reconfigurable chip and the reconfigurable chip form an integrated chip;

a legitimacy determination module 1404 configured to determine legitimacy of an operational firmware of the integrated chip based on the first process identity information;

a certificate generation module 1406 configured to generate a platform identity certificate used for verifying the user process based on the target operational firmware and the fixed operational firmware; and a certificate provision module 1408 configured to provide the platform identity certificate to the user process for verifying legitimacy of an identity of the user process.

According to the embodiments of the present application, by obtaining first process identity information, an operational firmware of an integrated chip is determined to be legitimate based on the first process identity information. A platform identity certificate used for verifying a user process is generated based on a target operational firmware and a fixed operational firmware. The platform identity certificate is provided to the user process for proving that an identity of the user process is legitimate. As such, the first process identity information generated for the user process by the integrated chip can prove the legitimacy of the fixed operational firmware of the non-reconfigurable part, and can also prove the legitimacy of the target operational firmware of the reconfigurable part. In a situation that the operational firmware of the integrated chip is dynamically changed, the problem that the legitimacy of the entire integrated chip cannot be verified is solved. Furthermore, after verifying that the identity of the user process is legitimate, the privacy certificate issuing authority issues the platform identity certificate to the user process to allow the user process to prove the legitimacy of the entire integrated chip using the platform identity certificate.

Figure 15:
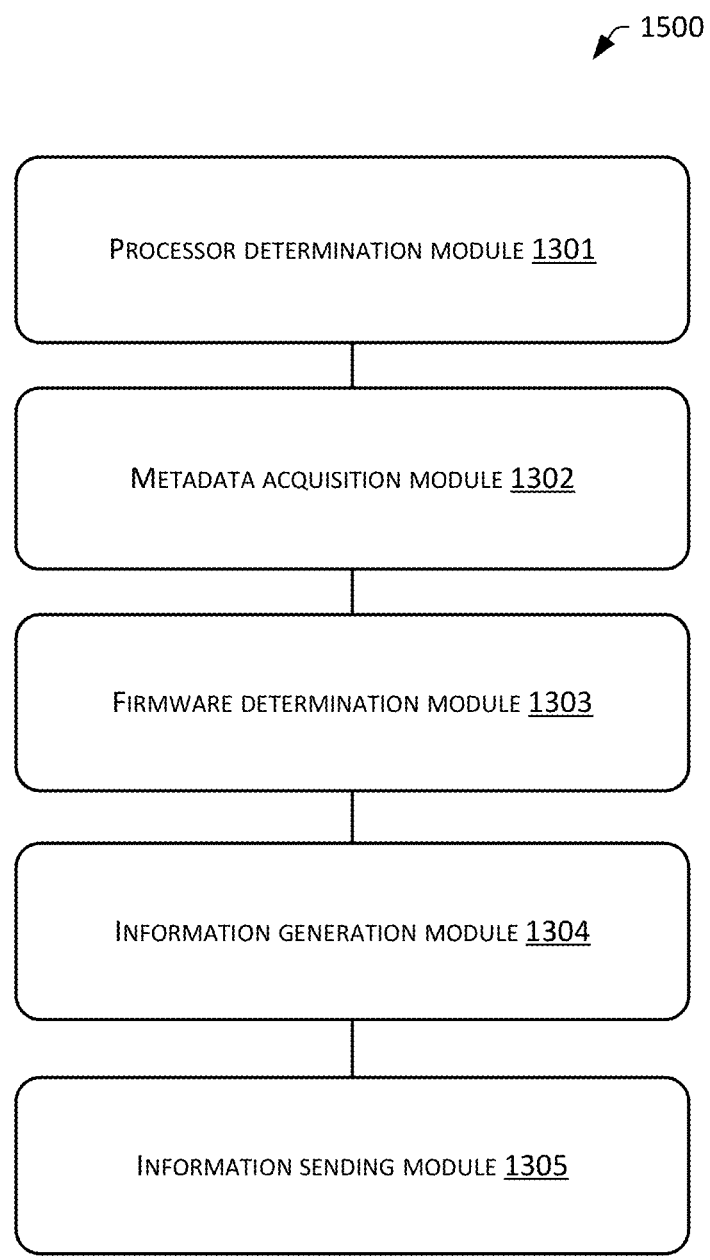
FIG. 15 illustrates a structural block diagram of an embodiment of a data processing apparatus according to the thirteenth embodiment of the present application.

Referring to FIG. 15, a structural block diagram showing an embodiment of a data processing apparatus 1500 according to the thirteenth embodiment of the present application is shown, which may specifically include:

A processor determination module 1502 is configured to determine, by a first computing device, a target processor.

In implementations, a first computing device and a second computing device correspond to each other. The first computing device is a computing device where a target process is located. The first computing device can use a target processor, and can also send identity information of the target process to the second computing device. The second computing device may perform first verification on a fixed operational firmware or a target operational firmware based on identity information, and determines whether the identity information meets a preset condition based on a result of the first verification.

The first computing device needs to utilize a target processor when generating identity information for a target process. The target processor includes a first sub-processor and a second sub-processor. The target processor includes an integrated chip. The first sub-processor includes a non-reconfigurable chip, and the second sub-processor includes a reconfigurable chip, which may specifically include any applicable target processor, first sub-processor, and second sub-processor, which are not limited in the embodiments of the present application.

A metadata acquisition module 1504 is configured to obtain, by the first computing device, metadata of the target processor corresponding to a target process.

In implementations,

A firmware determination module 1506 is configured to determine, by the first computing device, a fixed operational firmware of a first sub-processor and a target operational firmware of a second sub-processor based on the metadata.

An information generation module 1508 is configured to generate, by the first computing device, identity information of the target process based on the target operational firmware and the fixed operational firmware.

The identity information is used for performing a first verification of the fixed operational firmware or the target operational firmware.

The information sending module 1510 is configured to send, by the first computing device, the identity information to a second computing device.

Figure 16:
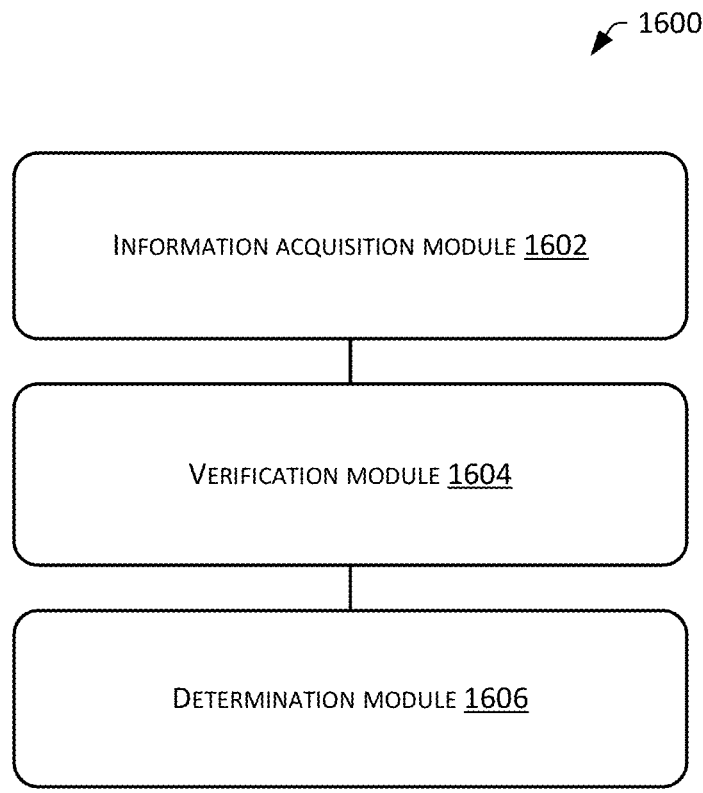
FIG. 16 illustrates a structural block diagram of an embodiment of a data processing apparatus according to the fourteenth embodiment of the present application.

Referring to FIG. 16, a structural block diagram of an embodiment of a data processing apparatus 1600 according to the fourteenth embodiment of the present application is shown, which may specifically include:

An information acquisition module 1602 is configured to obtain, by a second computing device, identity information of a target process, wherein:

a first computing device determines a target processor, obtains metadata of the target processor corresponding to a target process, determines a fixed operational firmware of a first sub-processor and a target operational firmware of a second sub-processor based on the metadata, and generates the identity information according to the target operational firmware and the fixed operational firmware.

A verification module 1604 is configured to perform, by the second computing device, a first verification on the fixed operational firmware or the target operational firmware based on the identity information.

A determination module 1606 is configured to determine, by the second computing device, whether the identity information meets a preset condition according to a result of the first verification.

Figure 17:
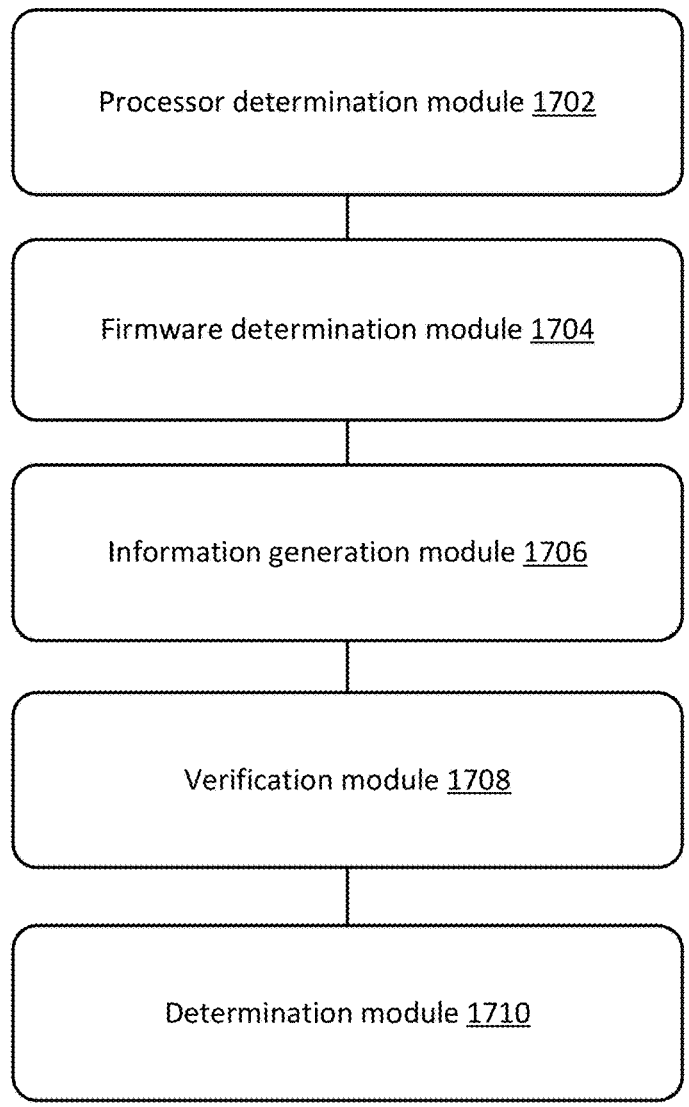
FIG. 17 illustrates a structural block diagram of an embodiment of a data processing apparatus according to the fifteenth embodiment of the present application.

Referring to FIG. 17, a structural block diagram of an embodiment of a data processing apparatus 1700 according to the fifteenth embodiment of the present application is shown, which may specifically include:

a processor determination module 1702 configured to determine a target processor, wherein:

the target processor includes a first sub-processor and a second sub-processor, the target processor including metadata corresponding to a target process;

a firmware determination module 1704 configured to determine a firmware of the first sub-processor and a target operational firmware of the second sub-processor based on the metadata;

an information generation module 1706 configured to generate identity information of the target process according to the target operational firmware and the fixed operational firmware;

a verification module 1708 configured to perform first verification on the fixed operational firmware or the target operational firmware based on the identity information; and a determination module 1710 configured to determine whether the identity information meets a preset condition according to a result of the first verification.

Figure 18:
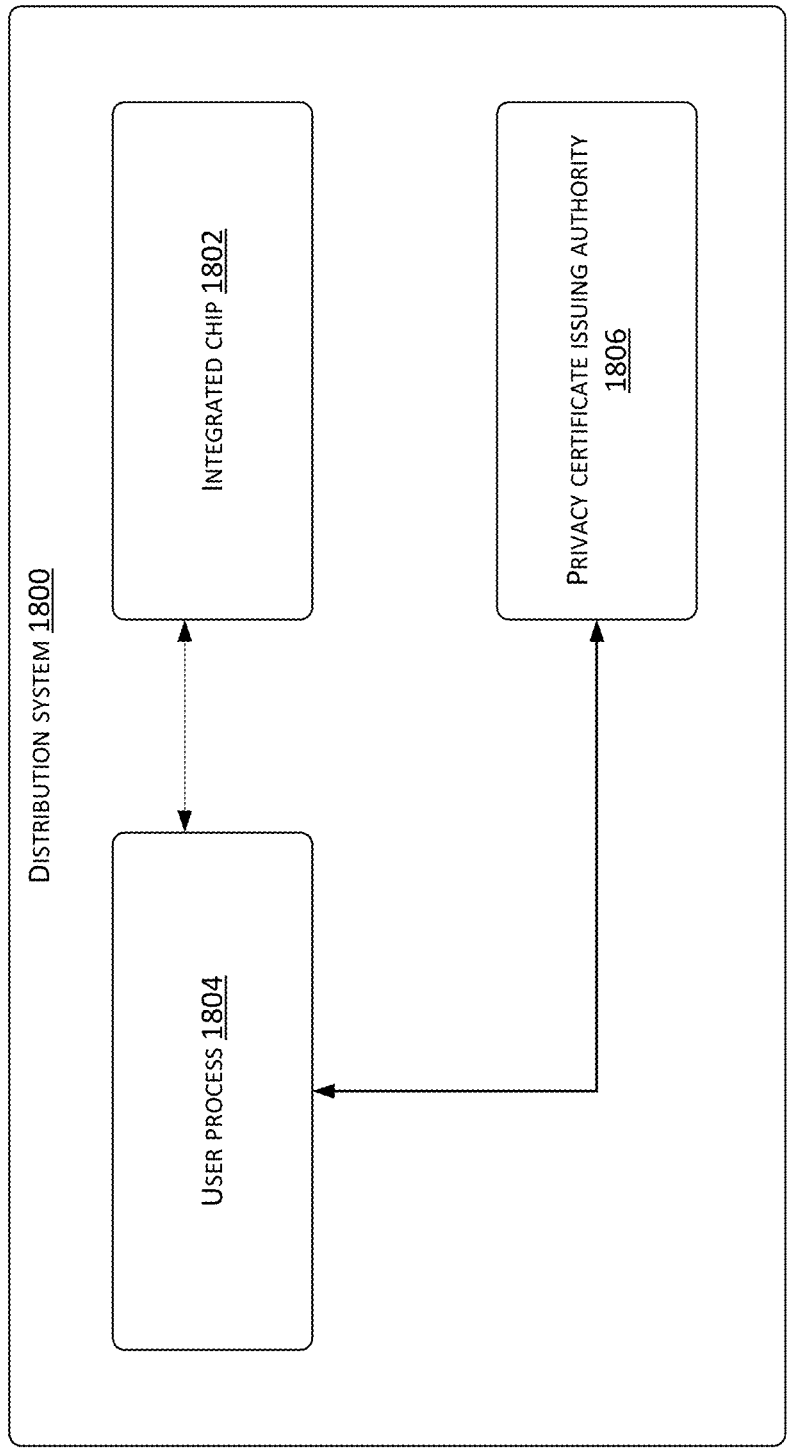
FIG. 18 illustrates a structural block diagram of an embodiment of an identity information distribution system according to the sixteenth embodiment of the present application.

FIG. 18 is a structural block diagram of an embodiment of a system for distributing identity information according to the sixth embodiment of the present application, which may specifically include:

a distribution system 1800 including an integrated chip 1802, a user process 1804, and a privacy certificate issuing authority 1806;

the integrated chip configured to obtain customized information of the user process for the integrated chip, wherein the integrated chip includes a non-reconfigurable chip and a reconfigurable chip; determine a target operational firmware preloaded on the reconfigurable chip according to the customized information; generate first process identity information used for verifying the user process based on the target operational firmware and a fixed operational firmware of the non-reconfigurable chip; and provide the first process identity information to the privacy certificate issuing authority for performing firmware legitimacy verification of a operational firmware to determine that an identity of the user process is legitimate according to a result of the legal firmware legitimacy verification;

the privacy certificate issuing authority configured to obtain the first process identity information, wherein the first process identity information is used for verifying the user process, and the first process identity information is generated based on the target operational firmware preloaded on the reconfigurable chip and the fixed operational firmware of a non-reconfigurable chip, and the non-reconfigurable chip and the reconfigurable chip constitute the integrated chip; and determine that the operational firmware of the integrated chip is legitimate according to the first process identity information; and the user process configured to provide the customized information to the integrated chip, to determine the target operational firmware preloaded on the reconfigurable chip according to the customized information, and to generate first process identity information used for verifying the user process based on the target operational firmware and the fixed operational firmware of the non-reconfigurable chip, wherein the integrated chip includes the non-reconfigurable chip and the reconfigurable chip; obtain the first process identity information returned by the integrated chip; provide the process identity information to the privacy certificate issuing authority for performing firmware legitimacy verification of the operational firmware to determine that the identity of the user process is legitimate according to the result of the firmware legitimacy verification.

According to the embodiments of the present application, by obtaining information of an integrated chip customized by a user process, and a target operational firmware preloaded on a reconfigurable chip is determined according to the customized information. First process identity information used for verifying the user process is then generated based on the target operational firmware and a fixed operational firmware of a non-reconfigurable chip. The first process identity information is then provided to a privacy certificate issuing authority for performing a firmware legitimacy verification of an operational firmware to determine that an identity of the user process is legitimate according to a result of the firmware legitimacy verification. As such, the first process identity information generated for the user process by the integrated chip can prove the legitimacy of the fixed operational firmware of the non-reconfigurable part of the firmware, and also prove the legitimacy of the target operational firmware of the reconfigurable part. In case when the operational firmware of the integrated chip is dynamically changed, the problem that the legitimacy of the entire integrated chip cannot be verified is solved.

Due to their basic similarities to the method embodiments, the description of the apparatus embodiments is relatively simple, and relevant parts can be referenced to the description of the method embodiments.

Figure 19:
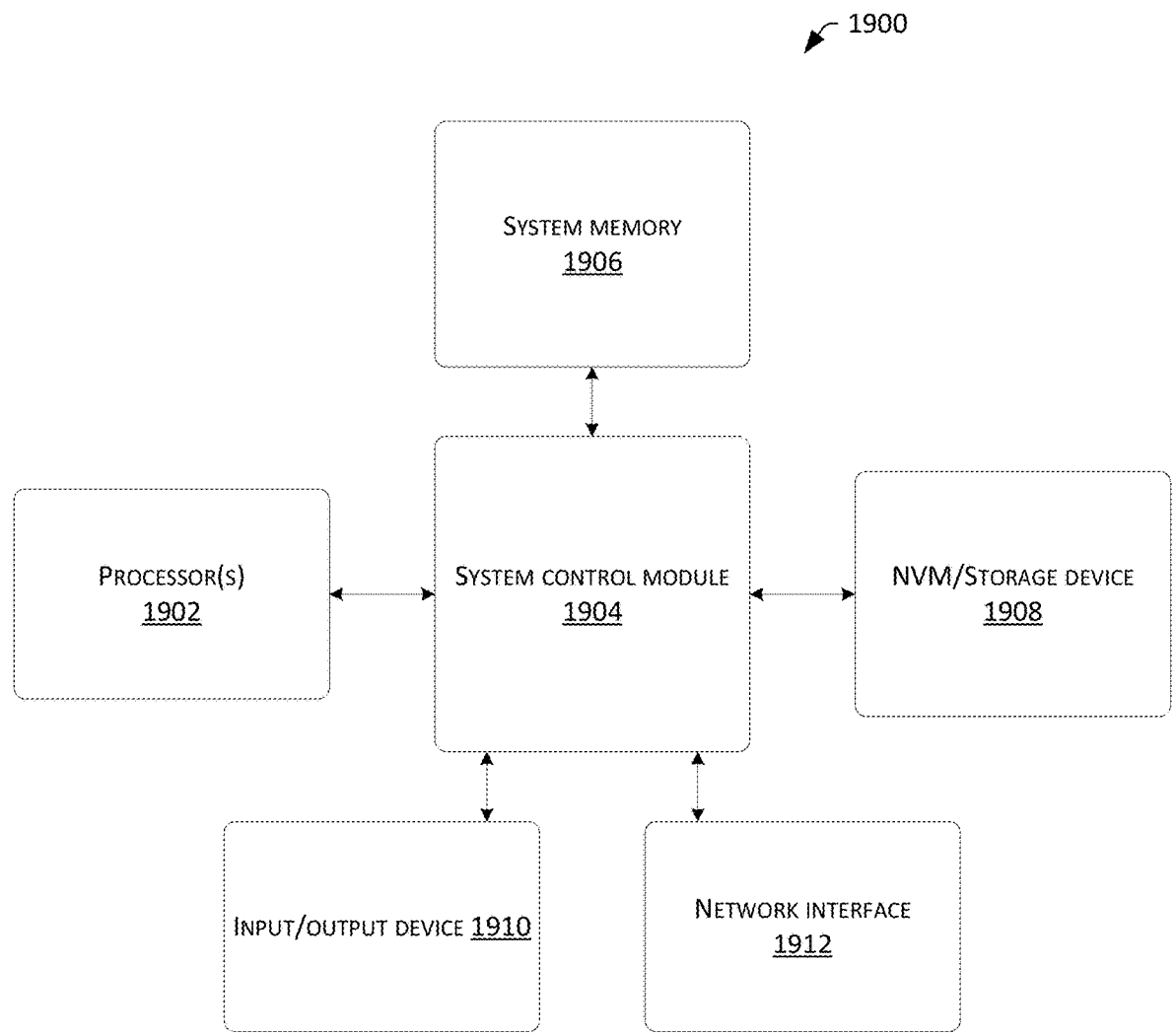
FIG. 19 illustrates an exemplary system that can be utilized to implement various embodiments described in the present disclosure.

The embodiments of the present disclosure can be implemented as a system for performing a desired configuration using any suitable hardware, firmware, software, or any combination thereof. FIG. 19 schematically illustrates an exemplary system (or apparatus) 1900 that can be used to implement various embodiments described in the present disclosure.

For an embodiment, FIG. 19 illustrates an exemplary system 1900 having one or more processors 1902, at least one system control module (chipset) 1904 coupled to processor(s) 1902, a system memory 1906 coupled to the system control module 1904, a non-volatile memory (NVM)/storage device 1908 coupled to the system control module 1904, and one or more input/output devices 1910 coupled to the system control module 1904, and a network interface 1912 coupled to the system control module 1906.

The processor 1902 may include one or more single or multi-core processors. The processor 1902 may include any combination of general purpose or special purpose processors (e.g., graphics processors, application processors, baseband processors, etc.). In some embodiments, the system 1900 can function as a browser as described in the embodiments of the present application.

In some embodiments, the system 1900 can include one or more processor-readable media (e.g., the system memory 1906 or the NVM/storage device 1908) having instructions, and one or more processors 1902 configured to execute the instructions in conjunction with the one or more processor-readable media to implement modules to perform actions described in the present disclosure.

In implementations, the system control module 1904 can include any suitable interface controller to at least one of the processor(s) 1902 and/or any suitable devices or components in communication with the system control module 1904 to provide any suitable interface.

The system control module 1904 can include a memory controller module to provide an interface to the system memory 1906. The memory controller module can be a hardware module, a software module, and/or a firmware module.

The system memory 1906 can be used, for example, for loading and storing data and/or instructions for the system 1900. In implementations, the system memory 1906 can include any suitable volatile memory, such as a suitable DRAM. In some embodiments, the system memory 1906 can include double data rate type quad synchronous dynamic random access memory (DDR4 SDRAM).

In implementations, the system control module 1904 can include one or more input/output controllers to provide an interface to the NVM/storage device 1908 and the input/output device(s) 1910.

For example, the NVM/storage device 1908 can be used for storing data and/or instructions. The NVM/storage device 1908 can include any suitable non-volatile memory (e.g., a flash memory) and/or can include any suitable non-volatile storage device(s) (e.g., one or more hard drives (HDD), one or more compact disc (CD) drives and/or one or more digital versatile disc (DVD) drives).

The NVM/storage device 1908 can include storage resources that are physically a part of a device on which the system 1900 is installed, or that can be accessed by the device without being to be a part of the device. For example, the NVM/storage device 1908 can be accessed through a network via the input/output device(s) 1910.

The input/output device(s) 1910 can provide an interface to the system 1900 to communicate with any other suitable devices. The input/output device 1910 can include a communication component, an audio component, a sensor component, and the like. The network interface 1912 can provide an interface for the system 1900 to conduct communications over one or more networks. The system 1900 can conduct wireless communications with one or more components of a wireless network in accordance with any standard and/or protocol of one or more standards and/or protocols of the wireless network, e.g., accessing a wireless network that is based on a communication standard, such as WiFi, 2G or 3G, or a combination thereof for conducting wireless communication.

In implementations, at least one of the processor(s) 1902 can be packaged with the logic of one or more controllers (e.g., memory controller modules) of the system control module 1904. In implementations, at least one of the processor(s) 1902 can be packaged with the logic of one or more controllers of the system control module 1904 to form a system in package (SiP). In implementations, at least one of the processor(s) 1902 can be integrated with the logic of one or more controllers of the system control module 1904 on a same mold. In implementations, at least one of the processor(s) 1902 can be integrated with the logic of one or more controllers of the system control module 1904 on a same mold to form a system on a chip (SoC).

In various embodiments, the system 1900 can be, but is not limited to, a browser, a workstation, a desktop computing device, or a mobile computing device (e.g., a laptop computing device, a handheld computing device, a tablet, a netbook, etc.). In various embodiments, the system 1900 can have more or fewer components and/or different architectures. For example, in some embodiments, the system 1900 includes one or more cameras, a keyboard, a liquid crystal display (LCD) screen (including a touch screen display), a non-volatile memory port, multiple antennas, a graphics chip, an application specific integrated circuit (ASIC), and speakers.

If the display includes a touch panel, the display screen can be implemented as a touch screen display to allow receiving of an input signal from a user. The touch panel includes one or more touch sensors to sense touches, slides, and gestures on the touch panel. The touch sensor may sense not only the boundary of a touching or sliding action, but also the duration and pressure associated with a touch or sliding operation.

The embodiments of the present application further provide a non-volatile readable storage medium. The storage medium stores one or more modules (programs), and when the one or more modules are applied to a terminal device, the terminal may be caused to execute instructions of various method operations in the embodiments of the present application.

In an example, a computing device is provided, which includes a memory, a processor, and a computer program stored on the memory and executable on the processor, wherein the processor implements the methods of the embodiments of the present application when executing the computer program.

In an example, a processor-readable storage medium is also provided, having a computer program stored thereon, wherein the program, when executed by a processor, implements one or more methods of the embodiments of the present application.

Figure 20:
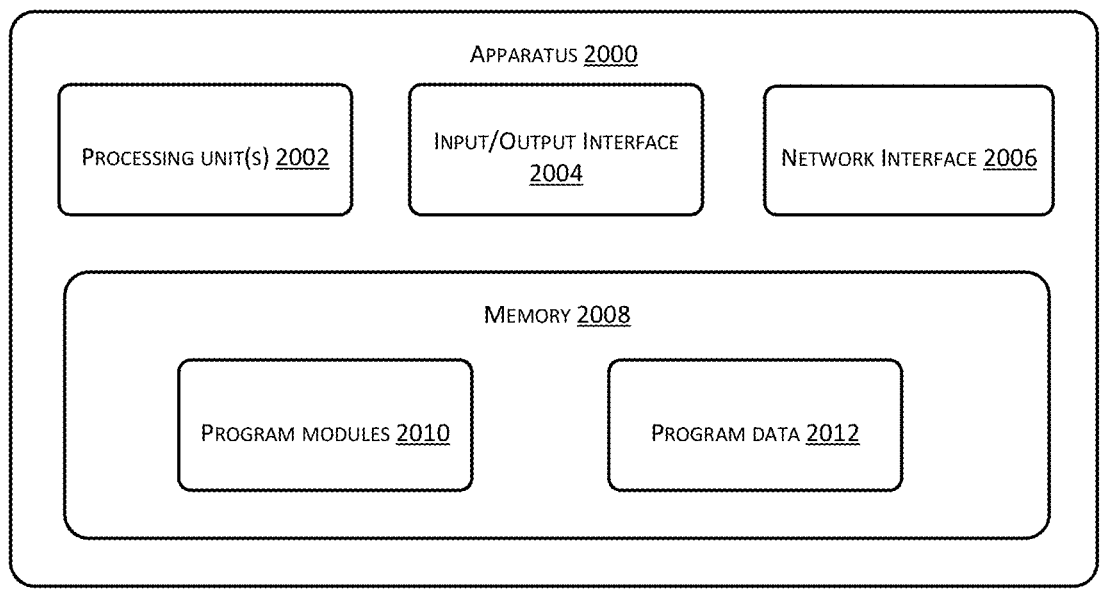
FIG. 20 illustrates an example apparatus as described in FIGS. 11-17 in further detail.

In implementations, FIG. 20 shows an example apparatus 2000 as described in FIGS. 11-17 in further detail. In implementations, the apparatus 2000 may include one or more computing devices. In a typical configuration, a computing device includes one or more processors (CPUs), input/output interfaces, network interfaces, and memory. In implementations, the apparatus 2000 may be a part of one or more computing devices, e.g., implemented or run by the one or more computing devices. In implementations, the one or more computing devices may be located in a single place or distributed among a plurality of network devices over a network. In implementations, the apparatus 2000 may be included in a cloud computing system. By way of example and not limitation, the apparatus 2000 may include one or more processors/processing units 2002, an input/output (I/O) interface 2004, a network interface 2006, and a memory 2008.

The memory 2008 may include a form of processor-readable media such as a volatile memory, a random access memory (RAM) and/or a non-volatile memory, for example, a read-only memory (ROM) or a flash RAM. The memory 2008 is an example of a processor-readable media.

The processor-readable media may include a volatile or non-volatile type, a removable or non-removable media, which may achieve storage of information using any method or technology. The information may include a processor-readable instruction, a data structure, a program module or other data. Examples of processor-readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the processor-readable media does not include transitory media, such as modulated data signals and carrier waves.

In implementations, the memory 2008 may include program modules 2010 and program data 2012. Depending on which apparatus (e.g., any one of the apparatuses 1100-1700) that the apparatus 2000 represents, the program modules 2010 may include one or more of the modules/sub-modules/units as described in the foregoing description and shown in FIGS. 11-17.

The embodiments of the present application disclose identity information distribution methods and apparatuses.

Example 1 includes an identity key and certificate distribution method, which is applied to a privacy certificate issuing authority, including:

obtaining first process identity information, wherein the first process identity information is used for verifying a user process, the first process identity information includes a process identity key, and the first process identity information is generated based on a target operational firmware that is preloaded on a reconfigurable chip and a fixed operational firmware of a non-reconfigurable chip, and the non-reconfigurable chip and the reconfigurable chip form an integrated chip;

determining legitimacy of an operational firmware of the integrated chip based on the first process identity information;

generating a platform identity certificate used for verifying the user process based on the target operational firmware and the fixed operational firmware; and providing the platform identity certificate to the user process for verifying legitimacy of an identity of the user process.

Example 2 includes an identity information processing method, the method including:

obtaining customized information of a user process on an integrated chip, wherein the integrated chip includes a non-reconfigurable chip and a reconfigurable chip;

determining a target operational firmware preloaded on the reconfigurable chip according to the customized information;

generating first process identity information used for verifying the user process according to the target operational firmware and a fixed operational firmware of the non-reconfigurable chip; and providing the first process identity information to a privacy certificate issuing authority for performing firmware legitimacy verification of the operational firmware to determine an identity of the user process to be legitimate according to a result of the firmware legitimacy verification.

Example 3 may include the method of Example 2, wherein the operational firmware includes one or more operational algorithms, and the customized information includes a preloaded firmware identification, the preloaded firmware identification corresponds to at least one operational algorithm, and the method further includes:

generating respective preloaded firmware identifications corresponding to a plurality of operational algorithms of the operational firmware according to a preloaded firmware identification corresponding to each operational algorithm.

Example 4 may include the method of Example 2 and/or Example 3, wherein the customized information includes a preloaded firmware identification, and generating the first process identity information used for verifying the user process based on the target operational firmware and the fixed operational firmware of the non-reconfigurable chip includes:

generating a firmware unique identification used for labeling the target operational firmware and the fixed operational firmware of the non-reconfigurable chip; and generating the first process identity information based on an integrated chip identification, the preloaded firmware identification, and the firmware unique identification.

Example 5 may include the method of one or more of Example 3-Example 4, wherein the customized information further includes a process identification and a platform identification, and generating the first process identity information based on the integrated chip identification, the preloaded firmware identification of the target operational firmware, and the firmware unique identification includes:

encrypting the firmware unique identification using a private key of the integrated chip; and encrypting a process identity public key that is generated by the integrated chip, the preloaded firmware identification, the integrated chip identification, the encrypted firmware unique identification, the process identification, and the platform identification using a process identity private key generated by the integrated chip, to obtain the first process identity information.

Example 6 may include the method of Example 2-Example 5, wherein the customized information further includes a first random number, and before generating the first process identity information based on the integrated chip identification, the preloaded firmware identification of the target operational firmware, and the firmware unique identification, the method further includes:

generating a second random number; and generating a process identity public key and a process identity private key based on the first random number, the second random number, and the process identification, wherein the process identity private key is stored on the integrated chip.

Example 7 may include the method of one or more of Example 2-Example 6, wherein the customized information is encrypted using a public key of the integrated chip, and the method further includes:

decrypting the customized information using a private key of the integrated chip, wherein generating the process identity public key based on the first random number, the second random number, and the process identification includes:

encrypting the first random number, the second random number, and the process identification using the private key of the integrated chip to generate the process identity public key, and providing the process identity public key to the privacy certificate issuing authority through the user process.

Example 8 may include the method of one or more of Example 2-Example 7, wherein the method further comprises:

generating integrated chip identity information based on the integrated chip identification, the public key of the integrated chip, and a chip producer identification, and providing the integrated chip identity information to the privacy certificate issuing authority through the user process.

Example 9 may include the method of one or more of Example 2-Example 8, wherein the integrated chip identity information is encrypted using the first random number, and the process identification and the integrated chip identity information obtained by decryption using the first random number are encrypted by the user process using a public key of the privacy certificate issuing authority, and provided to the privacy certificate issuing authority.

Example 10 may include the method of any one or more of Example 2-Example 9, wherein: when the user process obtains the first random number after using the public key of the integrated chip to decrypt the process identity public key, and a first integrated chip identification that is obtained by decrypting the first process identity information using the process identity public key is consistent with a second integrated chip identification that is obtained by decrypting the integrated chip identity information, the first process identity information, the process identity public key, the process identification, the platform identification, and the integrated chip identity information are provided by the user process to the privacy certificate issuing authority.

Example 11 may include the method of any one or more of Example 2-Example 10, wherein the customized information includes a first random number, and the method further includes:

obtaining second process identity information encrypted by a public key of the integrated chip;

decrypting the second process identity information using a private key of the integrated chip;

encrypting the second process identity information using the first random number and providing the encrypted second process identity information to the user process.

Example 12 may include the method of any one or more of Example 2-Example 11, wherein the encrypted second process identity information is forwarded to the integrated chip through the user process, and the user process decrypts the second process identity information using the first random number.

Example 13 includes an identity information processing method, the method including:

obtaining first process identity information, wherein the first process identity information is used for verifying a user process, and the first process identity information is generated based on a target operational firmware that is pre-loaded on a reconfigurable chip and a fixed operational firmware of a non-reconfigurable chip, the non-reconfigurable chip and the reconfigurable chip form an integrated chip; and determining that the operational firmware of the integrated chip is legitimate according to the first process identity information.

Example 14 may include the method of Example 13, wherein: after determining that the operational firmware of the integrated chip is legitimate according to the first process identity information, the method further includes:

generating second process identity information used for verifying the user process based on the target operational firmware and the fixed operational firmware; and providing the second process identity information to the user process for verifying the legitimacy of an identity of the user process.

Example 15 may include the method of Example 13 and/or Example 14, wherein the first process identity information further includes a process identification and a platform identification, and the second process identity information includes a platform identity certificate, and generating the second process identity information used for verifying the user process based on the target operational firmware and the fixed operational firmware includes:

encrypting a process identity public key generated by the integrated chip, a preloaded firmware identification of the target operational firmware, an integrated chip identification, and a firmware unique identification used for labeling the target operational firmware and the fixed operational firmware, the process identification, and the platform identification using a private key of a privacy certificate issuing authority to obtain the platform identity certificate.

Example 16 may include the method of one or more of Example 13-Example 15, wherein the first process identity information includes a preloaded firmware identification and an integrated chip identification, and determining that the operational firmware of the integrated chip is legitimate according to the first process identity information includes:

determining that the target operational firmware and the fixed operational firmware are legitimate based on the preloaded firmware identification and the integrated chip identification.

Example 17 may include the method of one or more of Example 13-Example 16, wherein: before determining that the target operational firmware and the fixed operational firmware are legitimate based on the preloaded firmware identification and the integrated chip identification, the method further includes:

obtaining a process identity public key;

decrypting the first process identity information using the process identity public key to obtain the preloaded firmware identification, the integrated chip identification, and a firmware unique identification used for labeling the target operational firmware and the fixed operational firmware.

Example 18 may include the method of one or more of Example 13-Example 17, wherein determining that the target operational firmware and the fixed operational firmware are legitimate based on the preloaded firmware identification and the integrated chip identification includes:

searching for a firmware unique identification on the privacy certificate issuing authority according to the preloaded firmware identification and the integrated chip identification; and comparing a firmware unique identification obtained from decryption with the firmware unique identification that is found to verify the legitimacy of the target operational firmware and the fixed operational firmware.

Example 19 may include the method of one or more of Example 13-Example 18, wherein the method further comprises:

obtaining integrated chip identity information; and verifying the legitimacy of integrated chip identity information using a chip production private key.

Example 20 may include the method of one or more of Example 13-Example 19, wherein the integrated chip identity information and the process identification are encrypted by the user process using a public key of the privacy certificate issuing authority, and then provided to the privacy certificate issuing authority, and wherein obtaining the integrated chip identity information includes:

performing decryption using a private key of the privacy certificate issuing authority to obtain the integrated chip identity information and a first process identification;

the method further includes:

decrypting the process identity public key using a public key of the integrated chip to obtain a second process identification; and comparing the first process identification with the second process identification, determining that the process identity public key and integrated chip identity information are generated for a same user process.

Example 21 may include the method of one or more of Example 13-Example 20, wherein the first process identity information includes a process identification, and the method further includes:

decrypting the first process identity information using the process identity public key to obtain the preloaded firmware identification, the integrated chip identification, and a third process identification; and comparing the first process identification with the third process identification, and comparing the integrated chip identity information with the pre-loaded firmware identification and the integrated chip identification obtained by decrypting the first process identity information, to determine that the process identity public key and the process identity private key are generated for the process identification by an legitimate integrated chip.

Example 22 includes an identity information processing method, the method including:

providing customized information to an integrated chip, to allow determination of a target operational firmware preloaded on a reconfigurable chip according to the customized information, and generation of first process identity information used for verifying a user process based on the target operational firmware and a fixed operational firmware of a non-reconfigurable chip, wherein the integrated chip includes the non-reconfigurable chip and the reconfigurable chip;

obtaining the first process identity information returned by the integrated chip; and providing the first process identity information to a privacy certificate issuing authority for performing a firmware legitimacy verification of the operational firmware to determine that an identity of the user process is legitimate according to a result of the firmware legitimacy verification.

Example 23 may include the method of Example 22, wherein the customized information includes a first random number, and the method further includes:

obtaining integrated chip identity information provided by the integrated chip, the integrated chip identity information being encrypted by the first random number;

decrypting the integrated chip identity information using the first random number; and encrypting the integrated chip identity information using a public key of the privacy certificate issuing authority and providing the encrypted integrated chip identity information to the privacy certificate issuing authority.

Example 24 may include the method of Example 22 and/or Example 23, wherein the method further includes:

decrypting a process identity public key using a public key of the integrated chip to obtain the first random number;

decrypting the first process identity information using the process identity public key to obtain a first integrated chip identification;

decrypting the integrated chip identity information to obtain a second integrated chip identification; and if the first integrated chip identification is consistent with the second integrated chip identification, providing the first process identity information, the process identity public key, a process identification, a platform identification, and the integrated chip identity information to the privacy certificate issuing authority.

Example 25 includes a data processing method including:

determining, by a first computing device, a target processor, wherein the target processor includes a first sub-processor and a second sub-processor;

obtaining, by the first computing device, metadata of the target processor corresponding to a target process;

determining, by the first computing device, a fixed operational firmware of the first sub-processor and a target operating firmware of the second sub-processor according to the metadata;

generating, by the first computing device, identity information of the target process according to the target operational firmware and the fixed operational firmware, wherein the identity information is used for performing a first verification of the fixed operational firmware or the target fixed operational firmware; and sending, by the first computing device, the identity information to a second computing device.

Example 26 includes a data processing method including:

obtaining, by a second computing device, identity information of a target process, wherein a first computing device determines a target processor, obtains metadata of the target processor corresponding to the target process, determines a fixed operational firmware of the first sub-processor and a target operational firmware of the second sub-processor according to the metadata, and generates the identity information based on the target operational firmware and the fixed operational firmware;

performing, by the second computing device, a first verification on the fixed operational firmware or the target operational firmware based on the identity information; and determining, by the second computing device, whether the identity information satisfies a preset condition according to a result of the first verification.

Example 27 includes a data processing method including:

determining a target processor, wherein the target processor includes a first sub-processor and a second sub-processor, and the target processor includes metadata corresponding to a target process;

determining a fixed operational firmware of the first sub-processor and a target operational firmware of the second sub-processor according to the metadata;

generating identity information of the target process according to the target operational firmware and the fixed operational firmware;

performing a first verification on the fixed operational firmware or the target operational firmware based on the identity information; and determining whether the identity information satisfies a preset condition according to a result of the first verification.

Example 28 includes a distribution apparatus for a platform identity key and a certificate, including:

an information acquisition module configured to obtain first process identity information, wherein the first process identity information is used for verifying a user process, the first process identity information includes a process identity key, and the first process identity information is generated based on a target operational firmware that is preloaded on a reconfigurable chip and a fixed operational firmware of a non-reconfigurable chip, and the non-reconfigurable chip and the reconfigurable chip form an integrated chip;

a legitimacy determination module configured to determine legitimacy of an operational firmware of the integrated chip based on the first process identity information;

a certificate generation module configured to generate a platform identity certificate used for verifying the user process based on the target operational firmware and the fixed operational firmware; and a certificate provision module configured to provide the platform identity certificate to the user process for verifying legitimacy of an identity of the user process.

Example 29 includes an identity information processing apparatus, the apparatus including:

a customized information acquisition module configured to obtain customized information of an integrated chip by a user process, wherein the integrated chip includes a non-reconfigurable chip and a reconfigurable chip;

a firmware determination module configured to determine a target operational firmware preloaded on the reconfigurable chip based on the customized information;

a first information generation module configured to generate first process identity information used for verifying the user process according to the target operational firmware and a fixed operational firmware of the non-reconfigurable chip; and an information provision module configured to provide the first process identity information to a privacy certificate issuing authority for firmware legitimacy verification of an operational firmware to determine that an identity of the user process is legitimate according to a result of the firmware legitimacy verification.

Example 30 may include the apparatus of Example 29, wherein the operational firmware includes one or more operational algorithms, wherein the customized information includes a preloaded firmware identification, the preloaded firmware identification corresponds to at least one operational algorithm, and the apparatus further comprises:

an identification generation module configured to generate respective preloaded firmware identifications corresponding to a plurality of operational algorithms of the operational firmware according to a preloaded firmware identification corresponding to each operational algorithm.

Example 31 may include the apparatus of Example 29 and/or Example 30, wherein the customized information carries a preloaded firmware identification, and the first information generating module includes:

a unique identification generation sub-module configured to generate a firmware unique identification used for labeling the target operational firmware and the fixed operational firmware of the non-reconfigurable chip; and an information generation sub-module configured to generate the first process identity information based on an integrated chip identification, the preloaded firmware identification, and the firmware unique identification.

Example 32 may include the apparatus of one or more of Example 29-Example 31, wherein the customized information further includes a process identification and a platform identification, and the information generation sub-module includes:

an identification encryption unit configured to encrypt the firmware unique identification using a private key of the integrated chip; and an information encryption unit configured to encrypt a process identity public key that is generated by the integrated chip, the preloaded firmware identification, the integrated chip identification, the encrypted firmware unique identification, the process identification, and the platform identification using a process identity private key generated by the integrated chip, to obtain the first process identity information.

Example 33 may include the apparatus of one or more of Example 29-Example 32, wherein the customized information further includes a first random number, and the apparatus further includes:

a second random number generation module configured to generate a second random number before generating the first process identity information based on the integrated chip identification, the preloaded firmware identification of the target operational firmware, and the firmware unique identification; and a public-private key generation module configured to generate a process identity public key and a process identity private key based on the first random number, the second random number, and the process identification, wherein the process identity private key is stored on the integrated chip.

Example 34 may include the apparatus of one or more of Example 29-Example 33, wherein the customized information is encrypted by using a public key of the integrated chip, and the apparatus further includes:

a customized information decryption module configured to decrypt the customized information using a private key of the integrated chip, and the public private key generation module includes:

a public key generation sub-module, configured to encrypt the first random number, the second random number, and the process identification using the private key of the integrated chip to generate the process identity public key, and providing the process identity public key to the privacy certificate issuing authority through the user process.

Example 35 may include the apparatus of one or more of Example 29-Example 34, wherein the apparatus further includes:

an integrated chip identity information generation module configured to generate integrated chip identity information based on the integrated chip identification, the public key of the integrated chip, and a chip producer identification, and providing the integrated chip identity information to the privacy certificate issuing authority through the user process.

Example 36 may include the apparatus of one or more of Example 29-Example 35, wherein the integrated chip identity information is encrypted using the first random number, and the process identification and the integrated chip identity information obtained by decryption using the first random number are encrypted by the user process using a public key of the privacy certificate issuing authority, and provided to the privacy certificate issuing authority.

Example 37 may include the apparatus of one or more of Example 29-Example 37, wherein: when the user process obtains the first random number after using the public key of the integrated chip to decrypt the process identity public key, and a first integrated chip identification that is obtained by decrypting the first process identity information using the process identity public key is consistent with a second integrated chip identification that is obtained by decrypting the integrated chip identity information, the first process identity information, the process identity public key, the process identification, the platform identification, and the integrated chip identity information are provided by the user process to the privacy certificate issuing authority.

Example 38 may include the apparatus of one or more of Example 29-Example 37, wherein the customized information includes a first random number, and the apparatus further includes:

a platform information acquisition module configured to obtain second process identity information encrypted by a public key of the integrated chip;

a platform information decryption module configured to decrypt the second process identity information using a private key of the integrated chip; and a platform information encryption module configured to encrypt the second process identity information using the first random number and providing the encrypted second process identity information to the user process.

Example 39 may include the apparatus of one or more of Example 29-Example 38, wherein the encrypted second process identity information is forwarded to the integrated chip through the user process, and the user process decrypts the second process identity information using the first random number.

Example 40 includes an identity information processing apparatus, the apparatus including:

a process information obtaining module configured to obtain first process identity information, wherein the first process identity information is used for verifying a user process, and the first process identity information is generated based on a target operational firmware that is pre-loaded on a reconfigurable chip and a fixed operational firmware of a non-reconfigurable chip, the non-reconfigurable chip and the reconfigurable chip form an integrated chip; and a legitimacy determination module configured to determine that the operational firmware of the integrated chip is legitimate according to the first process identity information.

Example 41 may include the apparatus of Example 40, wherein the apparatus further includes:

a second information generation module configured to: generating second process identity information used for verifying the user process based on the target operational firmware and the fixed operational firmware after determining that the operational firmware of the integrated chip is legitimate according to the first process identity information; and a second information provision module configured to provide the second process identity information to the user process for verifying the legitimacy of an identity of the user process.

Example 42 may include the apparatus of Example 40 and/or Example 41, wherein the first process identity information further includes a process identification and a platform identification, wherein the second process identity information includes a platform identity certificate, and the second information generation module includes:

a certificate generation sub-module configured to encrypt a process identity public key generated by the integrated chip, a preloaded firmware identification of the target operational firmware, an integrated chip identification, and a firmware unique identification used for labeling the target operational firmware and the fixed operational firmware, the process identification, and the platform identification using a private key of a privacy certificate issuing authority to obtain the platform identity certificate.

Example 43 may include the apparatus of one or more of Example 40-Example 42, wherein the first process identity information includes a preloaded firmware identification and an integrated chip identification, and the legitimacy determination module includes:

a legitimacy determination sub-module configured to determine that the target operational firmware and the fixed operational firmware are legitimate based on the preloaded firmware identification and the integrated chip identification.

Example 44 may include the apparatus of one or more of Example 40-Example 43, wherein the apparatus further comprises:

a public key acquisition module configured to obtain a process identity public key before determining that the target operational firmware and the fixed operational firmware are legitimate based on the preloaded firmware identification and the integrated chip identification; and a process information decryption module configured to decrypt the first process identity information using the process identity public key to obtain the preloaded firmware identification, the integrated chip identification, and a firmware unique identification used for labeling the target operational firmware and the fixed operational firmware.

Example 45 may include the apparatus of one or more of Example 40-Example 44, wherein the legitimacy determination sub-module includes:

an identification searching unit configured to search for a firmware unique identification on the privacy certificate issuing authority according to the preloaded firmware identification and the integrated chip identification; and a legitimacy verification unit configured to compare a firmware unique identification obtained from decryption with the firmware unique identification that is found to verify the legitimacy of the target operational firmware and the fixed operational firmware.

Example 46 can include the apparatus of one or more of Example 40-Example 45, wherein the apparatus further comprises:

a chip information acquisition module configured to obtain integrated chip identity information; and a legitimacy verification module configured to verify the legitimacy of integrated chip identity information using a chip production private key.

Example 47 may include the apparatus of one or more of Example 40-Example 46, wherein the integrated chip identity information and the process identification are encrypted by the user process using a public key of the privacy certificate issuing authority, and then provided to the privacy certificate issuing authority, and the chip information acquisition module includes:

a decryption sub-module configured to perform decryption using a private key of the privacy certificate issuing authority to obtain the integrated chip identity information and a first process identification, and wherein the apparatus further includes:

a public key decryption module configured to decrypt the process identity public key using a public key of the integrated chip to obtain a second process identification; and a first identity comparison module configured to compare the first process identification with the second process identification, determining that the process identity public key and integrated chip identity information are generated for a same user process.

Example 48 may include the apparatus of one or more of Example 40-Example 47, wherein the first process identity information includes a process identification, and the apparatus further includes:

an information decryption module configured to decrypt the first process identity information using the process identity public key to obtain the preloaded firmware identification, the integrated chip identification, and a third process identification; and a second identification comparison module configured to compare the first process identification with the third process identification, and comparing the integrated chip identity information with the pre-loaded firmware identification and the integrated chip identification obtained by decrypting the first process identity information, to determine that the process identity public key and the process identity private key are generated for the process identification by an legitimate integrated chip.

Example 49 includes an identity information processing apparatus, the apparatus including:

a customized information provision module configured to provide customized information to an integrated chip, to allow determination of a target operational firmware pre-loaded on a reconfigurable chip according to the customized information, and generation of first process identity information used for verifying a user process based on the target operational firmware and a fixed operational firmware of a non-reconfigurable chip, wherein the integrated chip includes the non-reconfigurable chip and the reconfigurable chip;

an information acquisition module configured to obtain the first process identity information returned by the integrated chip; and an information provision module configured to provide the first process identity information to a privacy certificate issuing authority for performing a firmware legitimacy verification of the operational firmware to determine that an identity of the user process is legitimate according to a result of the firmware legitimacy verification.

Example 50 may include the apparatus of Example 49, wherein the customized information includes a first random number, and the apparatus further includes:

an information acquisition module configured to obtain integrated chip identity information provided by the integrated chip, the integrated chip identity information being encrypted by the first random number;

an information decryption module configured to decrypt the integrated chip identity information using the first random number; and an identity information encryption module configured to encrypt the integrated chip identity information using a public key of the privacy certificate issuing authority and providing the encrypted integrated chip identity information to the privacy certificate issuing authority.

Example 51 can include the apparatus of Example 49 and/or Example 50, wherein the apparatus further comprises:

a first decryption module configured to decrypt a process identity public key using a public key of the integrated chip to obtain the first random number;

a second decryption module configured to decrypt the first process identity information using the process identity public key to obtain a first integrated chip identification;

a third decryption module configured to decrypt the integrated chip identity information to obtain a second integrated chip identification; and a provision module configured to provide the first process identity information, the process identity public key, a process identification, a platform identification, and the integrated chip identity information to the privacy certificate issuing authority if the first integrated chip identification is consistent with the second integrated chip identification.

Example 52 includes a data processing apparatus comprising:

a processor determination module configured to determine, by a first computing device, a target processor, wherein the target processor includes a first sub-processor and a second sub-processor;

a metadata acquisition module, configured to obtain, by the first computing device, metadata of the target processor corresponding to a target process;

a firmware determination module configured to determine, by the first computing device, a fixed operational firmware of a first sub-processor and a target operational firmware of a second sub-processor based on the metadata;

an information generation module, configured to generate, by the first computing device, identity information of the target process based on the target operational firmware and the fixed operational firmware, wherein the identity information is used for performing a first verification of the fixed operational firmware or the target operational firmware; and an information sending module, configured to send, by the first computing device, the identity information to a second computing device.

Example 53 includes a data processing apparatus including:

an information acquisition module configured to obtain, by a second computing device, identity information of a target process, wherein: a first computing device determines a target processor, obtains metadata of the target processor corresponding to a target process, determines a fixed operational firmware of a first sub-processor and a target operational firmware of a second sub-processor based on the metadata, and generates the identity information according to the target operational firmware and the fixed operational firmware.

a verification module configured to perform, by the second computing device, a first verification on the fixed operational firmware or the target operational firmware based on the identity information; and a determination module configured to determine, by the second computing device, whether the identity information meets a preset condition according to a result of the first verification.

Example 54 includes a data processing apparatus comprising:

a processor determination module configured to determine a target processor, wherein the target processor includes a first sub-processor and a second sub-processor, the target processor including metadata corresponding to a target process;

a firmware determination module configured to determine a firmware of the first sub-processor and a target operational firmware of the second sub-processor based on the metadata;

an information generation module configured to generate identity information of the target process according to the target operational firmware and the fixed operational firmware;

a verification module configured to perform first verification on the fixed operational firmware or the target operational firmware based on the identity information; and a determination module configured to determine whether the identity information meets a preset condition according to a result of the first verification.

Example 55 includes a distribution system for identity information, the distribution system including an integrated chip, a user process, and a privacy certificate issuing authority;

the integrated chip configured to obtain customized information of the user process for the integrated chip, wherein the integrated chip includes a non-reconfigurable chip and a reconfigurable chip; determine a target operational firmware preloaded on the reconfigurable chip according to the customized information; generate first process identity information used for verifying the user process based on the target operational firmware and a fixed operational firmware of the non-reconfigurable chip; and provide the first process identity information to the privacy certificate issuing authority for performing firmware legitimacy verification of a operational firmware to determine that an identity of the user process is legitimate according to a result of the legal firmware legitimacy verification;

the privacy certificate issuing authority configured to obtain the first process identity information, wherein the first process identity information is used for verifying the user process, and the first process identity information is generated based on the target operational firmware preloaded on the reconfigurable chip and the fixed operational firmware of a non-reconfigurable chip, and the non-reconfigurable chip and the reconfigurable chip constitute the integrated chip; and determine that the operational firmware of the integrated chip is legitimate according to the first process identity information; and the user process configured to provide the customized information to the integrated chip, to determine the target operational firmware preloaded on the reconfigurable chip according to the customized information, and to generate first process identity information used for verifying the user process based on the target operational firmware and the fixed operational firmware of the non-reconfigurable chip, wherein the integrated chip includes the non-reconfigurable chip and the reconfigurable chip; obtain the first process identity information returned by the integrated chip; provide the process identity information to the privacy certificate issuing authority for performing firmware legitimacy verification of the operational firmware to determine that the identity of the user process is legitimate according to the result of the firmware legitimacy verification.

Example 56: A computing device including a memory, a processor, and a computer program stored on the memory and executable by the processor, wherein the processor executes the computer program to implement the method of one or more of Examples 1-27.

Example 57: A processor-readable storage medium having stored a computer program thereon, wherein the program, when executed by a processor, implements the method of one or more of Examples 1-27.

Although certain embodiments are used for the purpose of illustration and description, various replacements and/or equivalents of the embodiments, or implementations having the same purpose and derived from the embodiments that are shown and described, do not depart from the scope of implementation of the present application. The present application is intended to cover any modifications or variations of the embodiments discussed herein. Therefore, it is apparent that the embodiments described herein are only defined by the claims and their equivalents.

What is claimed is:

1. A method comprising:
obtaining customized information of a user process on an integrated chip, wherein the integrated chip comprises a non-reconfigurable chip and a reconfigurable chip;
determining a target operational firmware preloaded on the reconfigurable chip according to the customized information;
generating first process identity information used for verifying the user process according to the target operational firmware and a fixed operational firmware of the non-reconfigurable chip;
providing the first process identity information to a privacy certificate issuing authority for performing firmware legitimacy verification of the target operational firmware and the fixed operational firmware by comparing at least a portion of information included in the first process identity information with previously stored information in the privacy certificate issuing authority to determine an identity of the user process to be legitimate according to a result of the firmware legitimacy verification; and
providing second process identity information to the user process to allow the user process to prove legitimacy of the integrated chip using the second process identity information.

2. The method of claim 1, wherein the target operational firmware comprises one or more operational algorithms, and the customized information comprises a preloaded firmware identification, the preloaded firmware identification corresponds to at least one operational algorithm, and the method further comprises:
generating respective preloaded firmware identifications corresponding to a plurality of operational algorithms of the target operational firmware according to a preloaded firmware identification corresponding to each operational algorithm.

3. The method of claim 1, wherein the customized information comprises a preloaded firmware identification, and generating the first process identity information used for verifying the user process based on the target operational firmware and the fixed operational firmware of the non-reconfigurable chip comprises:

generating a firmware unique identification used for labeling the target operational firmware and the fixed operational firmware of the non-reconfigurable chip; and generating the first process identity information based on an integrated chip identification, the preloaded firmware identification, and the firmware unique identification.

4. The method of claim 3, wherein the customized information further comprises a process identification and a platform identification, and generating the first process identity information based on the integrated chip identification, the preloaded firmware identification of the target operational firmware, and the firmware unique identification comprises:

encrypting the firmware unique identification using a private key of the integrated chip; and encrypting a process identity public key that is generated by the integrated chip, the preloaded firmware identification, the integrated chip identification, the encrypted firmware unique identification, the process identification, and the platform identification using a process identity private key generated by the integrated chip, to obtain the first process identity information.

5. The method of claim 3, wherein the customized information further comprises a first random number, and before generating the first process identity information based on the integrated chip identification, the preloaded firmware identification of the target operational firmware, and the firmware unique identification, the method further comprises:

generating a second random number; and generating a process identity public key and a process identity private key based on the first random number, the second random number, and the process identification, wherein the process identity private key is stored on the integrated chip.

6. The method of claim 5, wherein the customized information is encrypted using a public key of the integrated chip, and the method further comprises:

decrypting the customized information using a private key of the integrated chip, wherein generating the process identity public key based on the first random number, the second random number, and the process identification comprises:

encrypting the first random number, the second random number, and the process identification using the private key of the integrated chip to generate the process identity public key, and providing the process identity public key to the privacy certificate issuing authority through the user process.

7. The method of claim 6, wherein the method further comprises:

generating integrated chip identity information based on the integrated chip identification, the public key of the integrated chip, and a chip producer identification, and providing the integrated chip identity information to the privacy certificate issuing authority through the user process.

8. The method of claim 7, wherein the integrated chip identity information is encrypted using the first random number, and the process identification and the integrated chip identity information obtained by decryption using the first random number are encrypted by the user process using a public key of the privacy certificate issuing authority, and provided to the privacy certificate issuing authority.

9. The method of claim 8, wherein: when the user process obtains the first random number after using the public key of the integrated chip to decrypt the process identity public key, and a first integrated chip identification that is obtained by decrypting the first process identity information using the process identity public key is consistent with a second integrated chip identification that is obtained by decrypting the integrated chip identity information, the first process identity information, the process identity public key, the process identification, the platform identification, and the integrated chip identity information are provided by the user process to the privacy certificate issuing authority.

10. The method of claim 1, wherein the customized information comprises a first random number, and the method further comprises:

obtaining second process identity information encrypted by a public key of the integrated chip;

decrypting the second process identity information using a private key of the integrated chip;

encrypting the second process identity information using the first random number and providing the encrypted second process identity information to the user process.

11. The method of claim 10, wherein the encrypted second process identity information is forwarded to the integrated chip through the user process, and the user process decrypts the second process identity information using the first random number.

12. One or more processor-readable media storing executable instructions that, when executed by one or more processors, cause the one or more processors to perform acts comprising:

obtaining first process identity information, wherein the first process identity information is used for verifying a user process, and the first process identity information is generated based on a target operational firmware that is pre-loaded on a reconfigurable chip and a fixed operational firmware of a non-reconfigurable chip, the non-reconfigurable chip and the reconfigurable chip form an integrated chip;

determining that the target operational firmware and the fixed operational firmware of the integrated chip are legitimate based on a comparison between at least a portion of information included in the first process identity information and previously stored information of the integrated chip in a privacy certificate issuing authority; and providing second process identity information to the user process allow the user process to prove legitimacy of the integrated chip using the second process identity information.

13. The one or more processor-readable media of claim 12, wherein: after determining that the operational firmware of the integrated chip is legitimate according to the first process identity information, the method further comprises:

generating the second process identity information used for verifying the user process based on the target operational firmware and the fixed operational firmware; and providing the second process identity information to the user process for verifying the legitimacy of an identity of the user process.

14. The one or more processor-readable media of claim 13, wherein the first process identity information further comprises a process identification and a platform identification, and the second process identity information comprises a platform identity certificate, and generating the second process identity information used for verifying the user process based on the target operational firmware and the fixed operational firmware comprises:

encrypting a process identity public key generated by the integrated chip, a preloaded firmware identification of the target operational firmware, an integrated chip identification, and a firmware unique identification used for labeling the target operational firmware and the fixed operational firmware, the process identification, and the platform identification using a private key of the privacy certificate issuing authority to obtain the platform identity certificate.

15. The one or more processor-readable media of claim 12, wherein the first process identity information comprises a preloaded firmware identification and an integrated chip identification, and determining that the target operational firmware and the fixed operational firmware of the integrated chip are legitimate according to the first process identity information comprises:
   determining that the target operational firmware and the fixed operational firmware are legitimate based on the preloaded firmware identification and the integrated chip identification.

16. The one or more processor-readable media of claim 15, wherein: before determining that the target operational firmware and the fixed operational firmware are legitimate based on the preloaded firmware identification and the integrated chip identification, the method further comprises:
   obtaining a process identity public key;
   decrypting the first process identity information using the process identity public key to obtain the preloaded firmware identification, the integrated chip identification, and a firmware unique identification used for labeling the target operational firmware and the fixed operational firmware.

17. The one or more processor-readable media of claim 16, wherein determining that the target operational firmware and the fixed operational firmware are legitimate based on the preloaded firmware identification and the integrated chip identification comprises:
   searching for a firmware unique identification on the privacy certificate issuing authority according to the preloaded firmware identification and the integrated chip identification; and
   comparing a firmware unique identification obtained from decryption with the firmware unique identification that is found to verify the legitimacy of the target operational firmware and the fixed operational firmware.

18. A method comprising:
providing customized information to an integrated chip, to allow determination of a target operational firmware preloaded on a reconfigurable chip according to the customized information, and generation of first process identity information used for verifying a user process based on the target operational firmware and a fixed operational firmware of a non-reconfigurable chip, wherein the integrated chip comprises the non-reconfigurable chip and the reconfigurable chip;
obtaining the first process identity information returned by the integrated chip;
providing the first process identity information to a privacy certificate issuing authority for performing firmware legitimacy verification of the target operational firmware and the fixed operational firmware by comparing at least a portion of information included in the first process identity information with previously stored information in the privacy certificate issuing authority to determine that an identity of the user process is legitimate according to a result of the firmware legitimacy verification; and
receiving second process identity information from the privacy certificate issuing authority and using the second process identity information to prove legitimacy of the integrated chip.

19. The method of claim 18, wherein the customized information comprises a first random number, and the method further comprises:
   obtaining integrated chip identity information provided by the integrated chip, the integrated chip identity information being encrypted by the first random number;
   decrypting the integrated chip identity information using the first random number; and
   encrypting the integrated chip identity information using a public key of the privacy certificate issuing authority and providing the encrypted integrated chip identity information to the privacy certificate issuing authority.

20. The method of claim 19, wherein the method further comprises:
   decrypting a process identity public key using a public key of the integrated chip to obtain the first random number;
   decrypting the first process identity information using the process identity public key to obtain a first integrated chip identification;
   decrypting the integrated chip identity information to obtain a second integrated chip identification; and
   if the first integrated chip identification is consistent with the second integrated chip identification, providing the first process identity information, the process identity public key, a process identification, a platform identification, and the integrated chip identity information to the privacy certificate issuing authority.

* * * * *